US006836891B2

(12) United States Patent
Okada et al.

(10) Patent No.: US 6,836,891 B2
(45) Date of Patent: *Dec. 28, 2004

(54) OBJECT COLLABORATION APPARATUS

(75) Inventors: Makoto Okada, Kawasaki (JP);
Tadashige Iwao, Kawasaki (JP);
Satoru Ushijima, Kawasaki (JP); Yuji Wada, Kawasaki (JP); Masatoshi Shiouchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

This patent is subject to a terminal disclaimer.

(21) Appl. No.: 09/812,826

(22) Filed: Mar. 21, 2001

(65) Prior Publication Data

US 2001/0013072 A1 Aug. 9, 2001

Related U.S. Application Data

(63) Continuation of application No. PCT/JP99/05382, filed on Sep. 29, 1999.

(30) Foreign Application Priority Data

Oct. 2, 1998 (JP) .......................................... 10-281389
Jul. 29, 1999 (WO) ................................ PCT/JP99/04101

(51) Int. Cl.$^7$ ................................................ G06F 9/46
(52) U.S. Cl. ...................................... 719/313; 719/318
(58) Field of Search ................... 709/203; 719/314–318

(56) References Cited

U.S. PATENT DOCUMENTS

| | | | | |
|---|---|---|---|---|
| 5,907,704 A | * | 5/1999 | Gudmundson et al. | ...... 717/100 |
| 6,061,721 A | * | 5/2000 | Ismael et al. | ............... 709/223 |
| 6,212,577 B1 | * | 4/2001 | Stern et al. | .................. 709/329 |
| 6,347,342 B1 | * | 2/2002 | Marcos et al. | .............. 709/315 |
| 6,622,143 B1 | * | 9/2003 | Okada et al. | ............... 709/203 |

OTHER PUBLICATIONS

Dillenseger, Bruno, "From Interoperability to Cooperation: Building Intelligent Agents on Middleware", pp. 220–232.
Nodine, Marian H., et al., "Facilitating Open Communication in Agent Systems: The InfoSleuth Infostructure", pp. 281–295.
U.S. Appl. No. 09/126,324, "Network System and Object Cooperation Therein."
Iwao, Tadashige, et al., "Field–Reactor Model For Distributed Objects", pp. 13–18.
Iwao, Tadashige, et al., "Distributed Object Collaboration Using Field Reactor Library", pp. 525–530.
Okada, Makoto, et al., "Loosely–Coupled Collaboration System for Distributed Object Using Awareness Analogy", pp. 227–234.

* cited by examiner

Primary Examiner—Meng-Al T. An
Assistant Examiner—Li Zhen
(74) Attorney, Agent, or Firm—Staas & Halsey LLP

(57) ABSTRACT

An object collaboration apparatus is presented, in which driving is performed in accordance with message/action reaction relations, and the collaboration among objects can be changed in a flexible and dynamical manner.

A message/action reaction relation in a message/action reaction table 103 of a message/action reaction relation storage portion 102 storing relations between messages and information on actions that are reactions to the messages is separated with a message/action reaction relation separation portion 106 of a message/action reaction relation update control portion 105, and a new message/action relation is organized with a message/action reaction relation organizing portion 107. Object collaborations can be organized in a flexible and dynamical manner by inserting object collaboration relations, coupling independent object collaborations, external intervention of objects, participation in object collaborations by message sender-side multiplication and participation in object collaborations by message receiver-side multiplication.

28 Claims, 37 Drawing Sheets

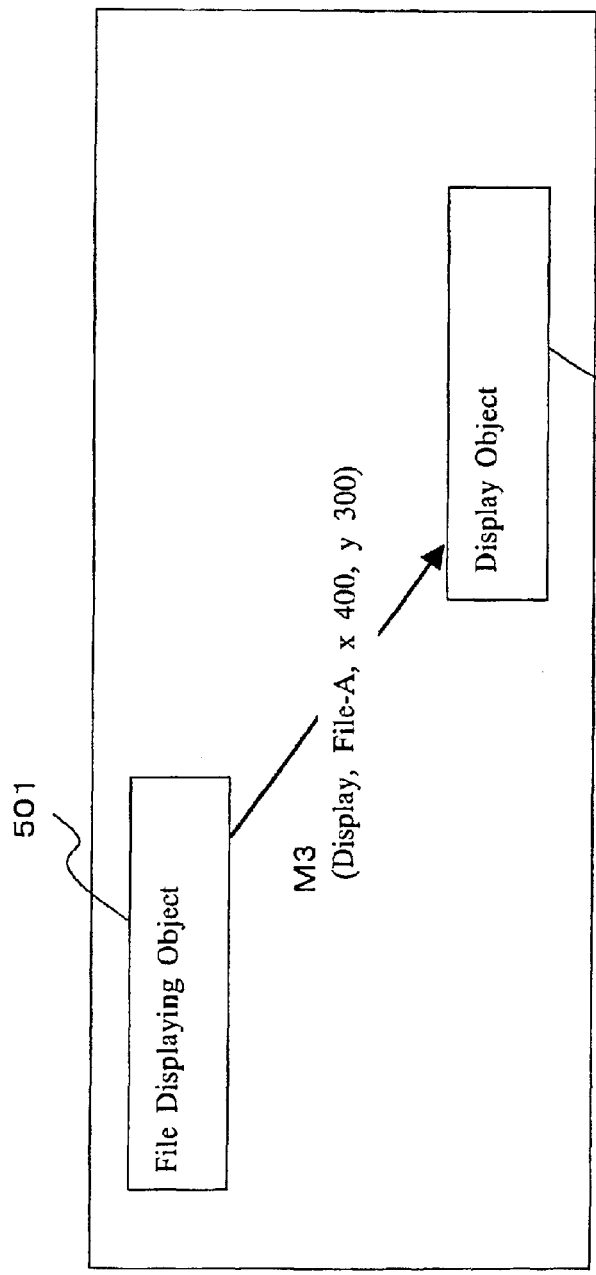

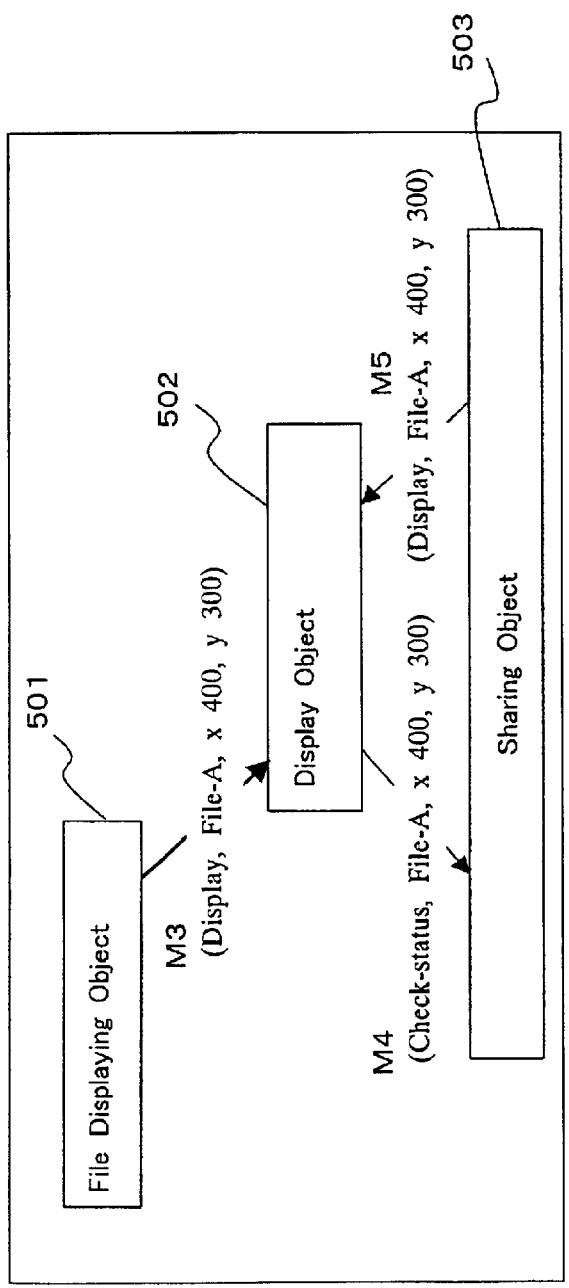

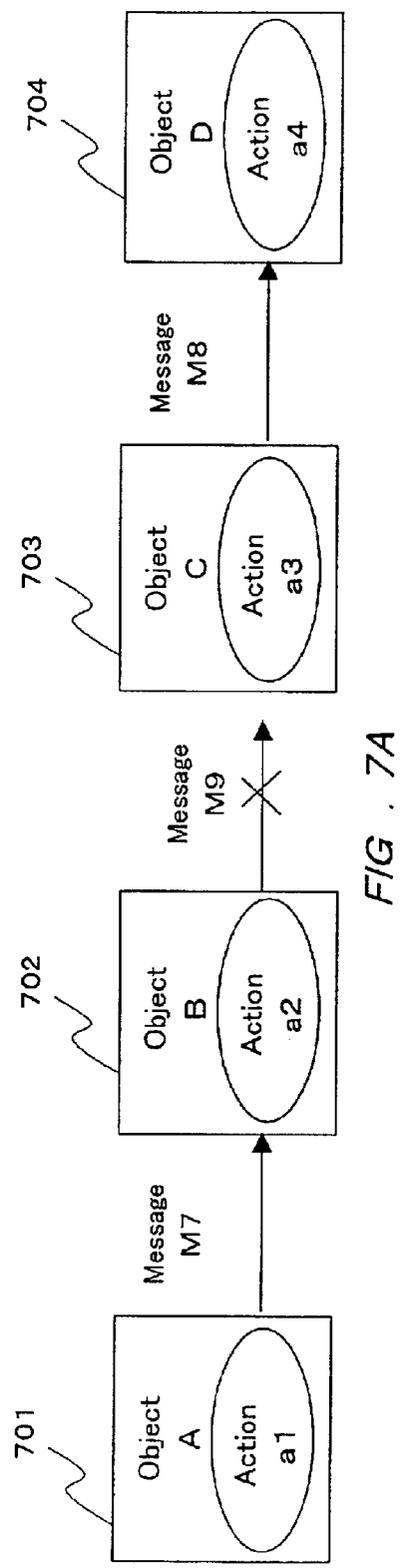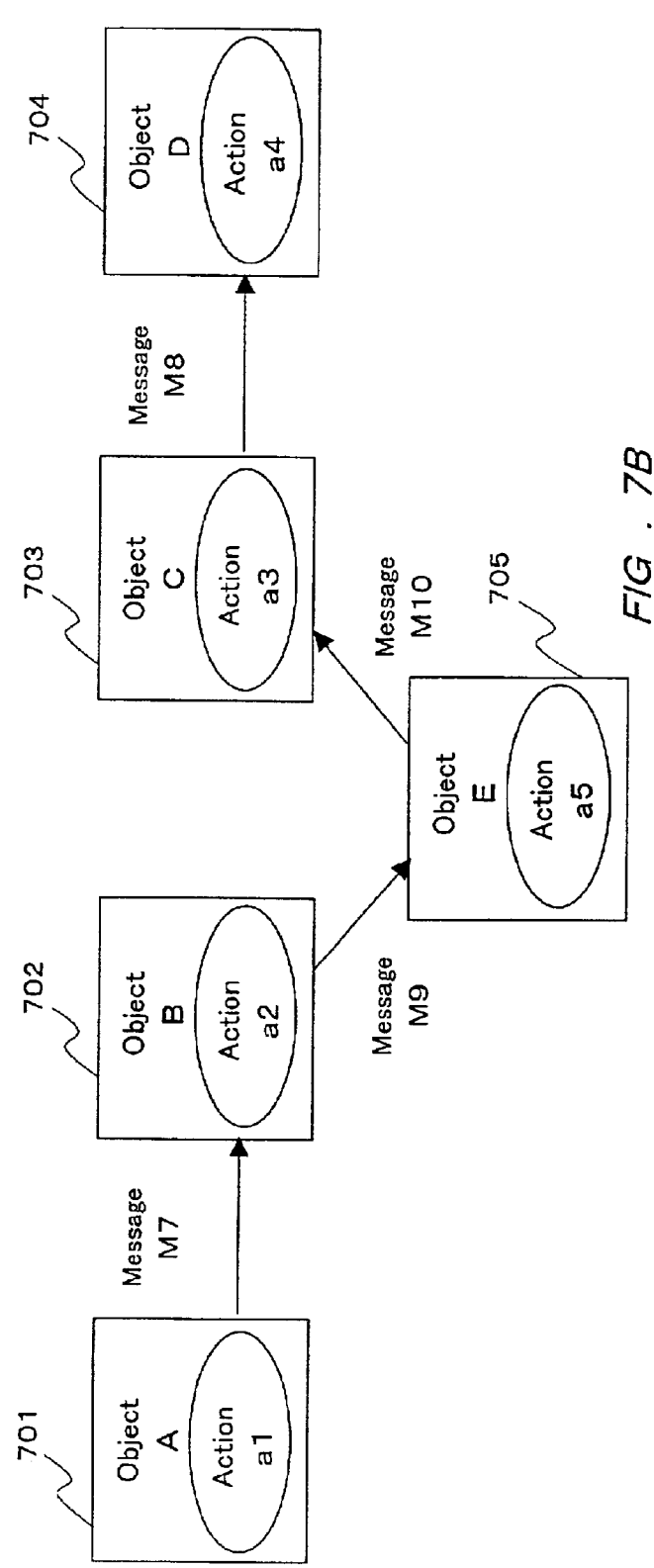
FIG. 7A
FIG. 7B

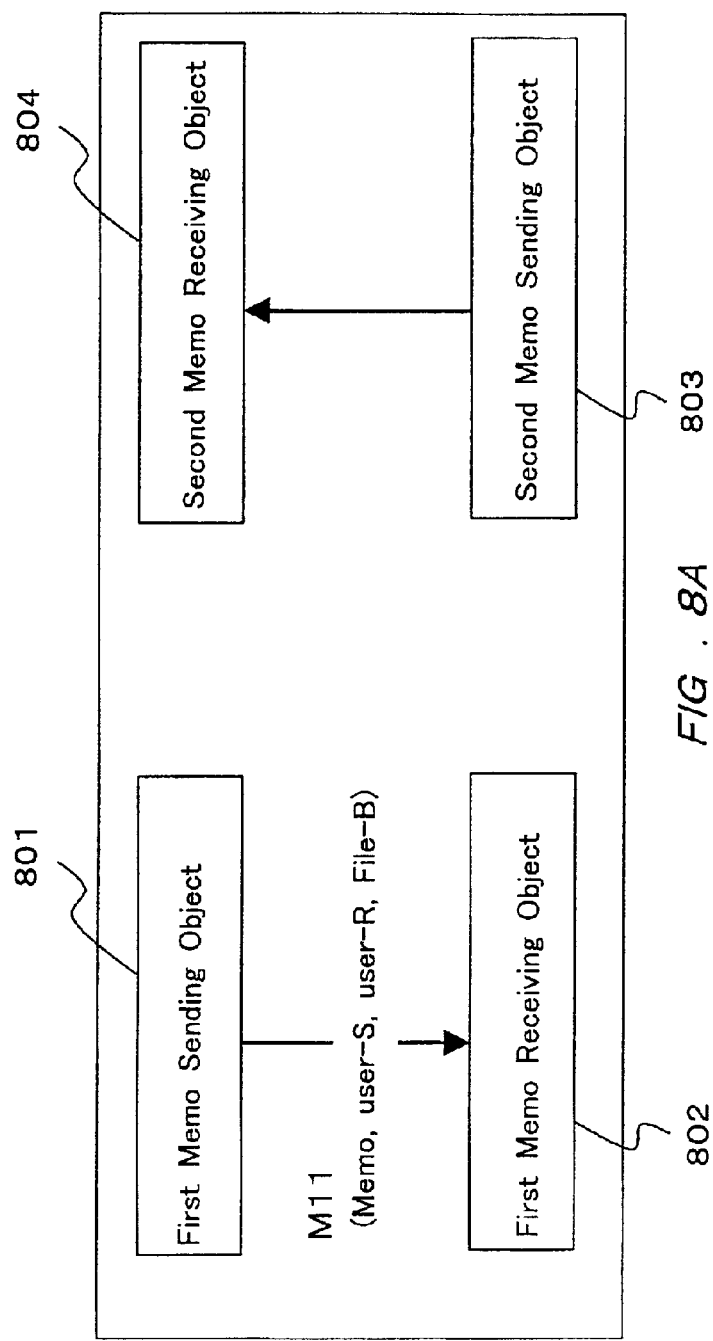

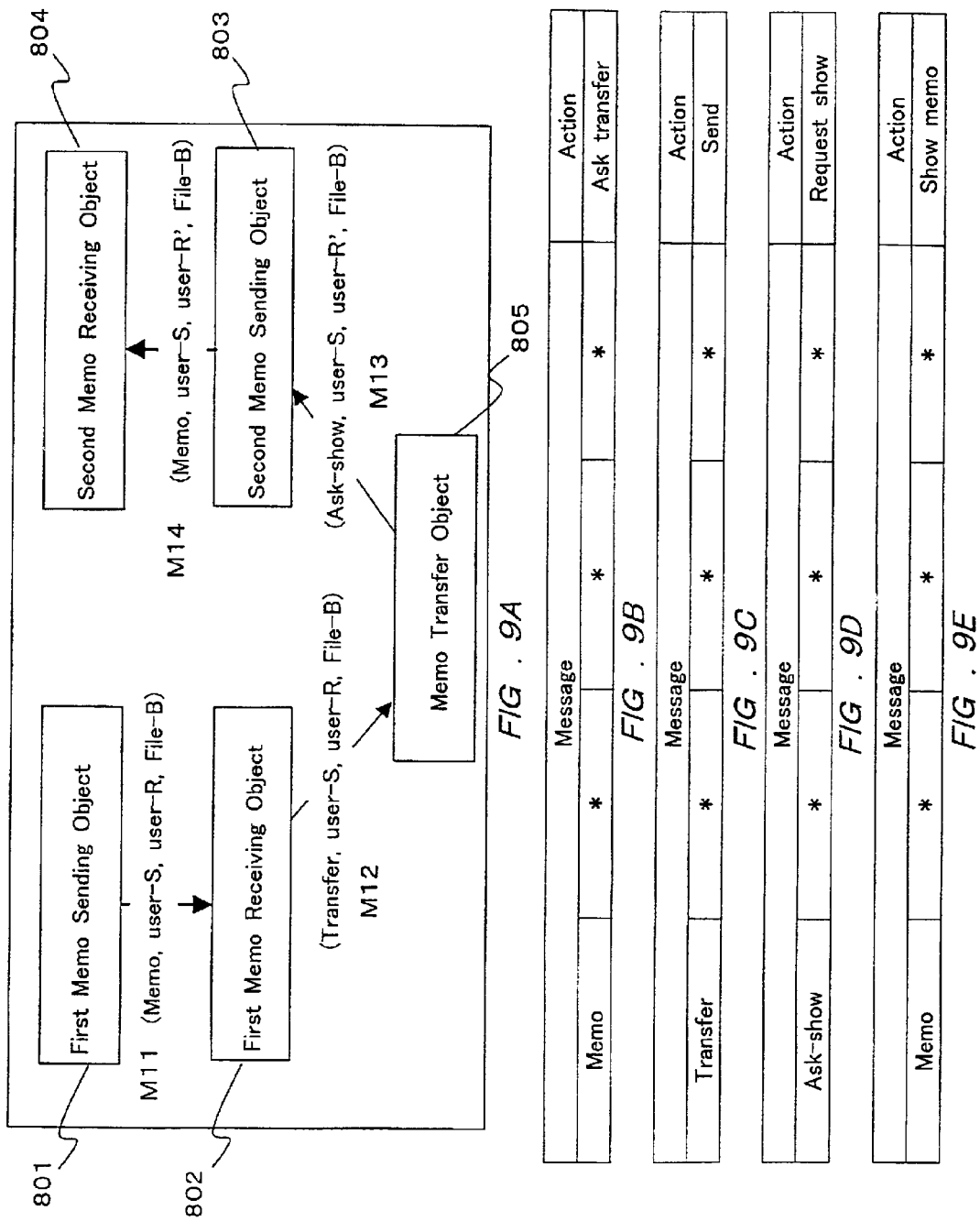

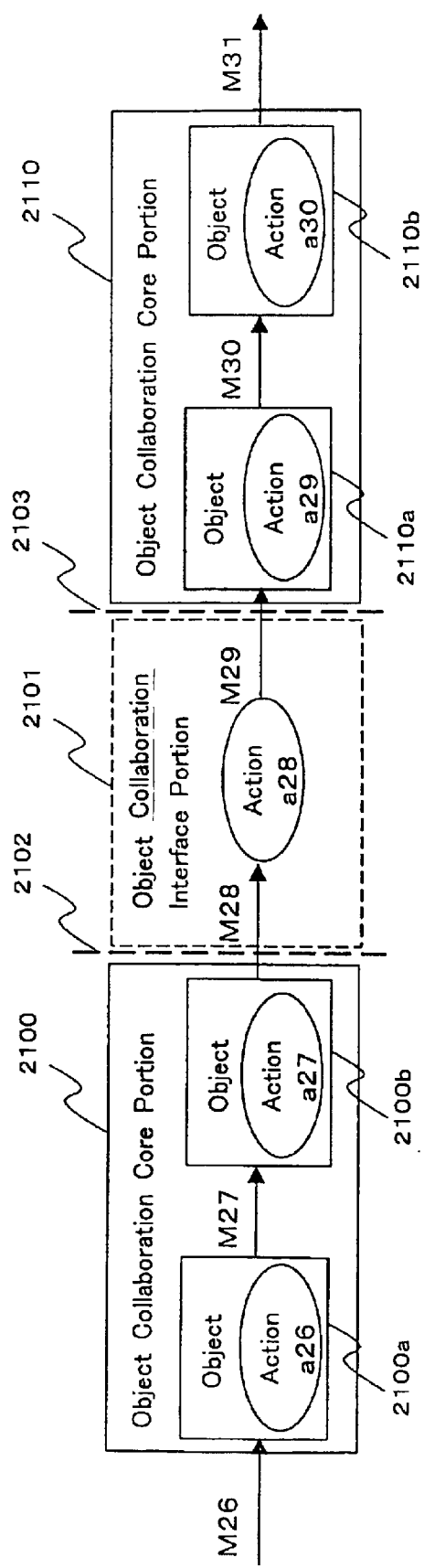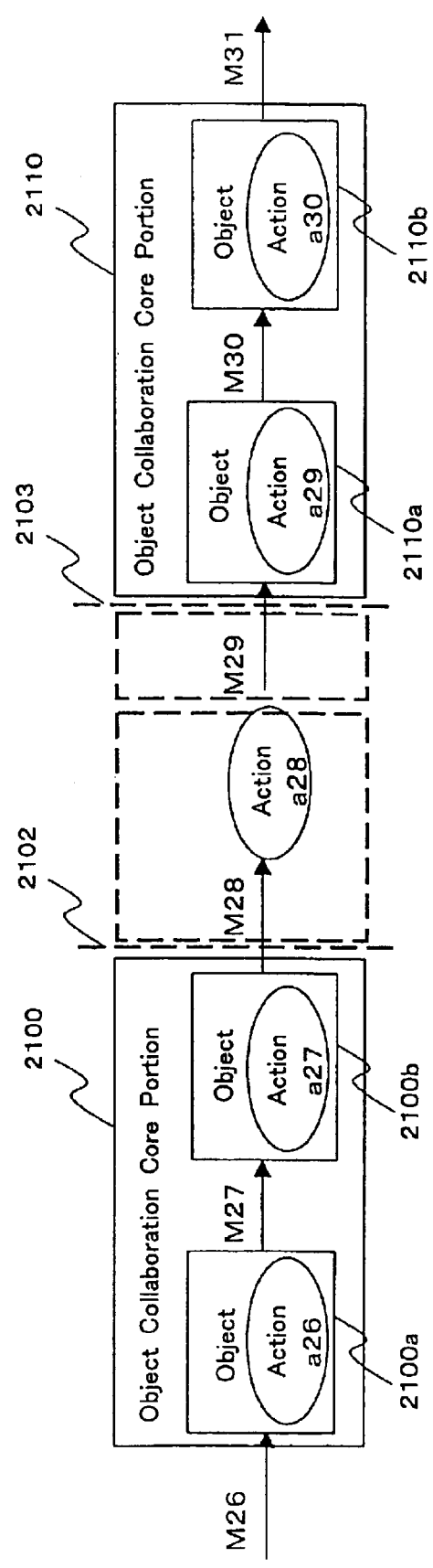
FIG. 21A
FIG. 21B (a)
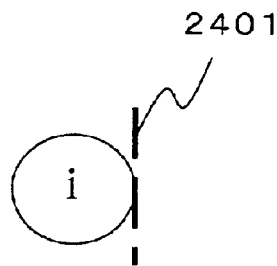    
(b)
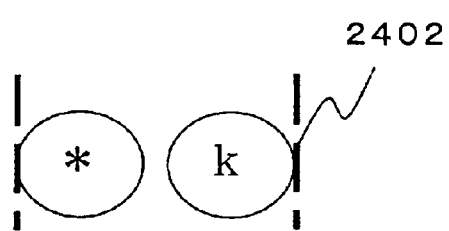
(c)
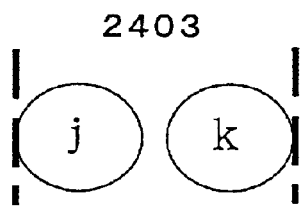
(d)
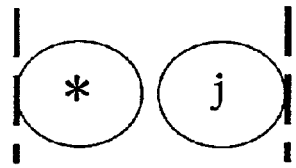
(e)
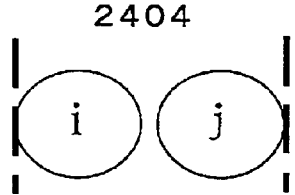
FIG. 25

```
<?xml version="1.0"?>
<!-- DTD Information -->
<!DOCTYPE SPEC [
    <!ELEMENT SPEC (MATRIX)*>
    <!ATTLIST SPEC NAME CDATA #IMPLIED>
    <!ELEMENT MATRIX (ENTRY)*>
    <!ATTLIST MATRIX NAME CDATA #IMPLIED>
    <!ELEMENT ENTRY (ITEM)*>
    <!ATTLIST ENTRY NAME CDATA #IMPLIED>
    <!ELEMENT ITEM (#PCDATA)>
    <!ATTLIST ITEM NAME CDATA #REQUIRED>
]>
```

FIG. 26

```
<?xml version="1.0"?>
<!-- Matrix Data -->
<!-- Matrix Data -->
<SPEC>
  <MATRIX NAME="FmtTranslate">
    <ENTRY>
      <ITEM NAME="Action"> "request" </ITEM>
      <ITEM NAME="Sender"> ui serv </ITEM>
      <ITEM NAME="RequestID"> dumy1 </ITEM>
      <ITEM NAME="OriginalMessageType">「i」</ITEM>
      <ITEM NAME="TargetMessageType">「k」</ITEM>
      <ITEM NAME="MessageKey">http://mach64:8888/selsrv/ui.phx@936244885600</ITEM>
    </ENTRY>
  </MATRIX>
</SPEC>
```

FIG. 27

```
<?xml version="1.0"?>
<!-- Matrix Data -->
<SPEC>
  <MATRIX NAME="FmtTranslate">
    <ENTRY>
      <ITEM NAME="Action"> "in-request" </ITEM>
      <ITEM NAME="Sender">http://mach64:8888/selsrv/imagearbiter.phx</ITEM>
      <ITEM NAME="RequestID">dumy1</ITEM>
      <ITEM NAME="OriginalMessageType">*</ITEM>
      <ITEM NAME="TargetMessageType">「k」</ITEM>
      <ITEM NAME="MessageKey">http://mach64:8888/selsrv/ui.phx@936244885600</ITEM>
      <ITEM NAME="PathHistory"></ITEM>
    </ENTRY>
  </MATRIX>
</SPEC>
```

FIG. 28

```xml
<?xml version="1.0"?>
<!-- Matrix Data -->
<SPEC>
   <MATRIX NAME="FmtTranslate">
      <ENTRY>
         <ITEM NAME="Action"> "bid" </ITEM>
         <ITEM NAME="Sender">http://mach64:8888/selsrv/「jJ2「kJ.phx</ITEM>
         <ITEM NAME="RequestID">dumy1</ITEM>
         <ITEM NAME="OriginalMessageType">「J」</ITEM>
         <ITEM NAME="TargetMessageType">「k」</ITEM>
         <ITEM NAME="MessageKey">http://mach64:8888/selsrv/ui.phx@936244885600</ITEM>
         <ITEM NAME="PathHistory">http://mach64:8888/selsrv/「jJ2「kJ.phx@「kJ,</ITEM>
      </ENTRY>
   </MATRIX>
</SPEC>
```

FIG. 29

```xml
<?xml version="1.0"?>
<!-- Matrix Data -->
<SPEC>
  <MATRIX NAME="FmtTranslate">
    <ENTRY>
      <ITEM NAME="Action"> "in-request" </ITEM>
      <ITEM NAME="Sender">http://mach64:8888/selsrv/imagearbiter.phx</ITEM>
      <ITEM NAME="RequestID">dumy1</ITEM>
      <ITEM NAME="OriginalMessageType">*</ITEM>
      <ITEM NAME="TargetMessageType">「J」</ITEM>
      <ITEM NAME="MessageKey">http://mach64:8888/selsrv/ui.phx@936244885600</ITEM>
      <ITEM NAME="PathHistory">http://mach64:8888/selsrv/「j」2「k」.phx@「k」,</ITEM>
    </ENTRY>
  </MATRIX>
</SPEC>
```

FIG. 30

```xml
<?xml version="1.0"?>
<!-- Matrix Data -->
<SPEC>
  <MATRIX NAME="FmtTranslate">
    <ENTRY>
      <ITEM NAME="Action"> "bid" </ITEM>
      <ITEM NAME="Sender">http://mach64:8888/selsrv/win2「j」.phx</ITEM>
      <ITEM NAME="RequestID">dumy1</ITEM>
      <ITEM NAME="OriginalMessageType">*</ITEM>
      <ITEM NAME="TargetMessageType">「J」</ITEM>
      <ITEM NAME="MessageKey">http://mach64:8888/selsrv/ui.phx@936244885600</ITEM>
      <ITEM NAME="PathHistory">http://mach64:8888/selsrv/win2「j」.phx@「J」,http://mach64:8888/selsrv/「j」2「k」.phx@「k」,</ITEM>
    </ENTRY>
  </MATRIX>
</SPEC>
```

*FIG. 31*

```xml
<?xml version="1.0"?>
<!-- Matrix Data -->
<SPEC>
  <MATRIX NAME="FmtTranslate">
    <ENTRY>
      <ITEM NAME="Action"> "in-serve" </ITEM>
      <ITEM NAME="Sender">http://mach64:8888/selsrv/imagearbiter.phx</ITEM>
      <ITEM NAME="RequestID">dumy1</ITEM>
      <ITEM NAME="Contract">http://mach64:8888/selsrv/win2「j」.phx</ITEM>
      <ITEM NAME="OriginalMessageType">「i」</ITEM>
      <ITEM NAME="TargetMessageType">「J」</ITEM>
      <ITEM NAME="MessageKey">http://mach64:8888/selsrv/ui.phx@936244885600</ITEM>
      <ITEM NAME="PathHistory">http://mach64:8888/selsrv/win2「j」.phx@「J」,http://mach64:8888/selsrv/「j」2「k」.phx@「k」,</ITEM>
    </ENTRY>
  </MATRIX>
</SPEC>
```

FIG. 32

```
<?xml version="1.0"?>
<!-- Matrix Data -->
<SPEC>
  <MATRIX NAME="FmtTranslate">
    <ENTRY>
      <ITEM NAME="Action"> "in-inform" </ITEM>
      <ITEM NAME="Sender">http://mach64:8888/selsrv/win2「j」.phx</ITEM>
      <ITEM NAME="RequestID">dumy1</ITEM>
      <ITEM NAME="OriginalMessageType">「i」</ITEM>
      <ITEM NAME="TargetMessageType">「J」</ITEM>
      <ITEM NAME="MessageKey">http://mach64:8888/selsrv/win2「j」.phx@936244893351</ITEM>
      <ITEM NAME="PathHistory">http://mach64:8888/selsrv/「j」2「k」.phx@「k」.</ITEM>
    </ENTRY>
  </MATRIX>
</SPEC>
```

FIG. 33

```xml
<?xml version="1.0"?>
<!-- Matrix Data -->
<SPEC>
  <MATRIX NAME="FmtTranslate">
    <ENTRY>
      <ITEM NAME="Action"> "in-serve" </ITEM>
      <ITEM NAME="Sender">http://mach64:8888/selsrv/imagearbiter.phx</ITEM>
      <ITEM NAME="RequestID">dumy1</ITEM>
      <ITEM NAME="Contract">http://mach64:8888/selsrv/「jj2「kj.phx</ITEM>
      <ITEM NAME="OriginalMessageType">「Jj</ITEM>
      <ITEM NAME="TargetMessageType">「kj</ITEM>
      <ITEM NAME="MessageKey">http://mach64:8888/selsrv/win2「jj.phx@936244893351</ITEM>
      <ITEM NAME="PathHistory">http://mach64:8888/selsrv/「jj2「kj.phx@「kj,</ITEM>
    </ENTRY>
  </MATRIX>
</SPEC>
```

FIG. 34

```
<?xml version="1.0"?>
<!-- Matrix Data -->
<SPEC>
   <MATRIX NAME="FmtTranslate">
     <ENTRY>
        <ITEM NAME="Action"> "in-inform" </ITEM>
        <ITEM NAME="Sender">http://mach64:8888/selsrv
/「j」2「k」.phx</ITEM>
        <ITEM NAME="RequestID">dumy1</ITEM>
        <ITEM NAME="OriginalMessageType">「J」</ITEM>
        <ITEM NAME="TargetMessageType">「k」</ITEM>
        <ITEM NAME="MessageKey">   http://mach64:888
8/selsrv/「j」2「k」.phx@912761245632</ITEM>
        <ITEM NAME="PathHistory"></ITEM>
     </ENTRY>
   </MATRIX>
</SPEC>
```

FIG. 35

OBJECT COLLABORATION APPARATUS

This application is a continuing application, filed under 35 U.S.C. §111(a), of International Application PCT/JP99/05382, filed Sep. 29, 1999, it being further noted that priority is based upon Japanese Patent Application 10-281389, filed Oct. 2, 1998 and PCT/JP99/04101, filed Jul. 29, 1999.

TECHNICAL FIELD

The present invention relates to an object collaboration apparatus for performing collaboration processing such as communication and cooperation between a group of computers or objects, and relates to an object collaboration apparatus for organizing a system, in which a plurality of processes arise in an object-oriented environment, and which flexibly adjusts to environmental changes and progressively changes accordingly through a computer network.

BACKGROUND ART

As the use of networks has spread in recent years, the number of systems in which a plurality of objects distributed on a network perform a process while collaborating with each other is increasing. As techniques for such objects to perform a process in collaboration with each other, research focuses on object-oriented programming and component technology.

One example of object-oriented programming is the open specification for operating distributed objects CORBA (Common Object Request Broker: Architecture and Specification), issued by the trade association OMG (Object Management Group), which has been set up in order to standardize and promote object-oriented technology.

FIG. 37 shows an example of an object collaboration in a client/server system based on CORBA. In this system, a series of processes is conducted by collaboration of a client application and a server application, namely by an object collaboration.

Application developers describe the service interface provided by a client and a server with IDL (Interface Definition Language). The interface is defined by a group of operations that can be requested from an object. For each operation, the name of the operation, parameters, return value, error exception processing, and additional information are defined.

Compiling the content defined with IDL by a specialized compiler creates a stub for a client and a skeleton for a server. The stub is a group of routines that provide a client application with access to a group of operations defined with IDL. In the client application, calling the routine provided by the stub activates the operation. The skeleton provides a dispatching routine to a method routine provided by a server application.

The stub and the skeleton are generated in a programming language which is used by the corresponding client application or server application. For example, if C is used as the programming language, the stub is formed as a group of functions in C. The client application calls the function corresponding to the operation to be carried out, thereby calling the corresponding routine of the server application via the stub, ORB run time and the skeleton. After executing the predetermined processing, the processing result is returned to the client application which originated the call.

Thus, organizing object collaboration processing has become easier with CORBA. However, when actually trying to organize such an object collaboration processing with CORBA, it is necessary not only to understand CORBA itself, but also to design the object according to the CORBA specifications and define it with IDL. In other words, to construct the system it is necessary to fully understand CORBA's application methods.

It is also necessary to be fully aware of the relationship between the objects. That is to say, it is necessary to make clear what kind of processing is conducted by each object, and which transmission parameters are required for the processing.

Creating an open interface between objects has increased the independence of objects. However, the existence of a fixed relationship between these objects is still a precondition.

When thinking of human communication, vague interaction often happens in reality. For example, when a person tries to solve a problem, he/she utilizes his/her own resources or asks other people for collaboration. In the case of utilizing the own resources, a problem is considered from various view points. Also, in the case of asking others for help, it is possible to ask either a specific person for help, or to broadly request assistance from an unspecified person. In the case of broadly asking an unspecified person for assistance, the reaction of the recipient varies in many ways. Some who have a solution may present an answer, while others may give advice by passing on their own experience and knowledge, even if that does not directly present a solution. Still others might ignore the inquiry because of total indifference. In other words, whether or not the recipient reacts to a certain piece of information depends on the recipient. Furthermore, when the recipient decides to react to the information, how the recipient does so depends on the recipient.

When the human being in this analogy is replaced with an object here, depending on the object there may be different reactions regarding the choice of receiving or not receiving information floated on a network or the processing performed in response to the received information. That is, a free collaboration is desirable in the collaboration between objects. In conventional collaboration methods, it was a precondition that the relation between objects was fixed, and it was difficult to organize collaboration systems with such free relations.

Thus, in distributed object system technology, for which CORBA and DCOM are prominent examples, the framework for providing access to an object that is transparent to the network and the framework with regard to interfaces for distributed objects are constantly improving. However, these frameworks are not adequate to answer the question of how to organize the dynamic collaboration between objects.

DISCLOSURE OF THE INVENTION

To solve these problems, it is an object of the present invention to increase the degree of freedom for collaboration among objects connected to a network or for collaboration among computers. It is also an object of the present invention to present an object collaboration apparatus performing collaboration processes such as communication or cooperation in groups of computers or groups of objects, responding in a flexible manner to changes of the environment in an object-oriented environment, and organizing a system that changes progressively.

Because the object collaboration apparatus of the present invention increases the degree of freedom and the flexibility of collaboration chains among organized objects, it is possible to insert new objects into the organized collaboration between objects, and to organize a new object collaboration in a flexible and dynamic manner. Moreover, it is possible to couple object collaborations that have no collaboration relation together, and thereby organize a new object collaboration in a flexible and dynamic manner. Furthermore, it is possible to disrupt the organized collaboration between objects and construct an object collaboration chain by inserting an external object so as to organize a new object collaboration in a flexible and dynamic manner by so-called external intervention. Also, it is possible to organize not only one-to-one object collaboration, but to organize a new one-to-many object collaboration in a flexible and dynamic manner by so-called receiver-side collaboration participation or to organize a new many-to-one object collaboration in a flexible and dynamic manner by so-called sender-side collaboration participation.

It is another object of the object collaboration apparatus of the present invention to enable the setting of collaboration conditions in the object collaboration relations and control the permission of collaborations among those objects, while ensuring the above-mentioned degree of freedom and flexibility of object collaboration.

It is another object of the object collaboration apparatus of the present invention to provide a function for easily and explicitly grasping the relation of organized object collaborations, namely, input message patterns to which the objects react, the objects' actions and output message patterns and the collaborations conditions.

It is another object of the object collaboration apparatus of the present invention to form object collaboration in a flexible manner given a message pattern of an object serving as a starting point of an object collaboration to be organized and a message pattern of an object serving as an ending point by searching an object forming a collaboration relation that connects the object of the starting point with the object of the ending point.

In order to solve the above-mentioned problems, it is necessary to organize the collaboration among objects in a more flexible manner. This cannot be solved simply by breaking up applications into more components but a framework is necessary, in which functions can be built dynamically, while objects interact with one another. However, if the relations among the collaborating objects are so close that they depend on each other's internal states and internal functions, then it is not easy to dynamically construct functions with this interaction. Consequently, flexible relations between the collaborating objects must be defined when trying to dynamically construct functions with collaborations.

The following aspects relate to human communication and human behavior for collaborating with each other. In human communication and human behavior for collaborating with each other, there is a condition called "awareness." There is a model that proposes that exchanging information based on this "awareness" creates the variation and flexibility of human communication and behavior.

In addition to the communication behavior, the "awareness" model acknowledges the exchange of information by communication entities that are not involved directly and purposively. Such "awareness" information, in fact, influences several aspects of behavior including the communication behavior.

In the field of distributed object systems technology, if collaboration processing between objects based on detected "awareness" could be performed with information processing similar to the "awareness" between human beings, then it should be possible to make the collaboration between objects flexible. Especially in situations where the other object of the collaboration changes dynamically, if the changing object and the object monitoring it can perform an information exchange similar to the "awareness" in human communication and can autonomously execute processing, then this can serve as an advantageous processing model between collaborating objects on the network. This is because the "awareness" model defines a flexible relationship in object collaboration and creates the flexibility and possibility of dynamic change in the collaboration between objects.

An object collaboration apparatus in accordance with the present invention organizes collaboration between objects by linking objects with relations between messages floating on an object field and actions corresponding to these messages, and changes the organized object collaboration relations in a flexible and dynamic manner by changing the relations between messages and actions in a flexible and dynamic manner In order to solve the above-mentioned problems, an object collaboration apparatus in accordance with the present invention includes a message receiving portion with which the objects monitor and input messages that have been sent over a network; a message/action reaction relation storage portion for storing relations between messages and information on actions that are reactions to the messages; and an action execution portion that executes actions in accordance with the message/action reaction relations; includes an action execution portion that executes actions in accordance with the message/action reaction relations; a message/action reaction relation update control portion for controlling an updating of reaction relations between messages and actions in accordance with the necessity to update the reaction relations between messages and actions; a message/action reaction relation separation portion for separating an existing message/action reaction relation in the message/action reaction relation storage portion specified by the message/action reaction relation update controlling portion; and a message/action reaction relation organizing portion for associating specified actions with specified messages with the message/action reaction relation update controlling portion; wherein a new relation between an action and a message is organized, intervening into an existing relation between an action and a message.

Here, if the specification of the message/action reaction relation update controlling portion is the specification of an existing message/action reaction relation and the specification of a new message/action reaction relation to be inserted, then the message/action reaction relation separation portion separates the existing message/action reaction relation based on this specification, and based on the specifications, the message/action reaction relation organizing portion associates the existing message with a new action and a associates a new message outputted as a part of the new action with the existing action, and an object having a new message/action reaction relation is inserted between the existing message and the exiting action.

With this configuration, changes in the flow of object collaboration can be performed in a flexible and dynamical manner by changing the message/action reaction relations, the necessity to perform program changes in objects and recompile, which exists when changing object collaborations in conventional systems, is eliminated, and it is possible to make system design with object collaborations more effective.

With the present invention, organizing, changing, deleting, or removing object collaboration relations in a flexible manner is made possible by employing a message/action reaction relation separation portion and a message/action reaction relation organizing portion. In one example, a cascaded insertion of object collaborations becomes possible by cascading the insertion of message/action reaction relations. Also, the removal of a specified object is possible, organizing an object collaboration by first separating the collaboration relations at a specified object, and then bypassing this object and setting a message/action reaction relation connecting the preceding and the following object. Furthermore, it is possible to couple independent objects by insertion of an object bridging a plurality of independent objects. Conversely, it is possible to separate an object collaboration by taking an object from a series of object collaborations and disrupting the collaboration with the preceding and following object. Furthermore, object collaboration can be made parallel by appropriate branching of collaboration relations of inserted or coupled objects.

The present invention uses these various kinds of object collaboration relations, and thus can be applied to a variety of system configurations. For example, if a plurality of objects are provided that react to a message resulting as an action of one object, then it is possible to devise an object collaboration apparatus with receiver-side participation, and it becomes possible to search objects from which a process can be requested with a bidding system. Conversely, if an object is organized, that reacts to messages sent from a plurality of objects, then it is possible to devise an object collaboration apparatus with sender-side participation, a plurality of parallel object collaborations can be bundled together, and it becomes possible to receive replies from objects to which a process is requested in a bidding system and award a bid.

Furthermore, in order to make the insertion of new object collaborations into a series of object collaborations easier, object collaborations include an object collaboration core portion, in which object collaboration relations are maintained as a core, and an object collaboration interface portion for interfacing collaboration between the object collaboration core portion and other objects, and if an object collaboration relation is changed, the relations of the object collaboration core portion are maintained unchanged, and the object collaboration relation is changed by changing the collaboration destination of the object collaboration interface portion.

With this configuration, by providing an object collaboration core portion that maintains object collaboration relations as a core, influence on this portion can be avoided when an object collaboration is changed, and by providing an object collaboration interface portion for interfacing collaboration between the object collaboration core portion and other objects, this portion can organize or change the relation with other objects. It is possible to insert several new object collaborations between collaborations of object collaboration interface portions, and it is possible to organize object collaboration by so-called cascaded connection in a flexible manner.

In order to attain the object of setting of collaboration conditions in the object collaboration relations to control the permission of collaborations among those objects, an object collaboration apparatus of the present invention includes a message/action reaction condition setting portion, sets for each object message/action reaction conditions for executing actions corresponding to received messages, the message/action reaction relation storage portion stores message/action reaction conditions associated with message/action reaction relations, and the action execution portion executes an action in response to received messages if the message/action reaction condition is fulfilled.

With this configuration, in order for an object to execute an action, in addition to receiving the corresponding message, it is possible to set a message/action reaction condition in order to react to this received message, and object collaboration can be controlled in a finely tuned manner by permitting or prohibiting collaboration between the objects.

In order to attain the object of providing a function for easily and explicitly grasping the relation of a chain of organized object collaborations, the object collaboration apparatus of the present invention includes an object collaboration relation presentation portion for presenting objects and object collaboration relations that have been organized between the objects. Taking an acceptance scope in which messages inputted by the message receiving portion are acceptable as input message pattern information and taking an output scope to which the action execution portion can output messages as output message pattern information, the object collaboration relation presentation portion presents the object collaboration relations to be presented as collaboration relations between the input message pattern information and the output message pattern information.

If the object collaboration relation presentation portion presents the message/action reaction conditions, then the relations of the organized object collaboration chain, namely the input message patterns to which the objects react, the objects' actions and output message patterns and the collaborations conditions, can be presented explicitly, and a person who can properly change the relations of the object collaboration chain, such as a programmer, system administrator, or user, can easily understand the object collaboration relations. The objects are displayed as icons, the object collaboration relations are displayed as link information among the icons, or, the object collaboration relations are displayed in a table, so that the object collaboration relations are visualized graphically, and can be grasped easily and explicitly. Moreover, as another means for presenting object collaboration relations, the object collaboration relation presentation portion can express input message pattern information and output message pattern as tags, and present the object collaboration relations to the user in form of tags of a programming language including tags, such as XML.

In an object collaboration apparatus of the present invention, it is preferable that the object collaboration relation presentation portion includes an object collaboration information inquiry function for inquiring object collaboration information of each of the objects; an object collaboration information collecting function for collecting object collaboration information of the objects, which is given by the objects in response to an inquiry to the objects; an object collaboration relation synthesizing function for synthesizing information of the object collaboration relations of all objects from the collected object collaboration information of the objects; and an object collaboration relation presentation function for presenting the synthesized object collaboration relations.

With this configuration, an object collaboration apparatus can be organized dynamically, updated object collaboration relations can be detected as necessary, and based on the result, the object collaboration relations can be presented explicitly to the user.

It is preferable that the object collaboration apparatus of the present invention includes an object collaboration control portion, the object collaboration control portion including an object collaboration change detection function for detecting when a change in the object collaboration relations organized by the object collaboration relation organizing function occurs; an object collaboration illogicality detection function for detecting when a collaboration illogicality occurs in the object collaborations; and an object collaboration logic protection function for canceling the object collaboration change when the object collaboration illogicality detection portion has detected an illogicality in the object collaborations.

With this configuration, an object collaboration apparatus can be organized dynamically, updated object collaboration relations can be examined and analyzed as necessary, and the organizing/changing of relations that obstruct object collaboration operation, such as endless loops of object collaborations, collisions of object collaboration relations etc. can be detected, the organizing/changing of such relations can be cancelled, and a smooth operation of the system can be ensured.

Furthermore, the object collaboration apparatus of the present invention includes an object searching portion that, given an object serving as the starting point of an object collaboration and an object serving as the ending point of an object collaboration, to form an object collaboration from the object serving as the starting point to the object serving as the ending point, detects the messages that an object on the network accepts as input message pattern information, and detects messages that are output as part of an action pattern as output information, and taking the input message pattern and the output message pattern as the search key, searches for an object having these patterns. To form an object collaboration from a first object serving as a starting point to a second object serving as an ending point, the object searching portion searches objects collaborating with these message patterns, taking the message patterns of the objects as a search key, and forms an object collaboration from the first object serving as the starting point to the second object serving as the ending point. For the searches there are various patterns, such as forward searching, backward searching or forward-and-backward bidirectional searching. In a forward search, to form an object collaboration from a first object serving as the starting point to a second object serving as the ending point, the object searching portion, in a first search, takes the output message pattern of the first object as the input message pattern and any pattern as the output message pattern, and searches a third object group; in a second search, takes the output message patterns of the objects of the third object group as the input message pattern and any pattern as the output message pattern, and searches a fourth object group; selects from the output message patterns of the objects of the fourth object group a fourth object whose output message pattern matches with the input message pattern of the second object, and selects from the objects of the third object group a third object having as the output message pattern the input message pattern of the selected fourth object; and forms an object collaboration from the first object via the third object and the fourth object to the second object.

Providing a computer-readable storage medium storing a program for realizing an object collaboration apparatus driven in accordance with the present invention, it is possible to organize an object collaboration apparatus that can organize an object collaboration apparatus of the present invention on a computer system, and organize or change the object collaboration apparatus in a flexible and dynamical manner, by reading the storage medium with a computer.

BRIEF DESCRIPTION OF THE DRAWINGS

FIG. 5 illustrates the concept of object collaboration before object collaboration insertion in the first embodiment of the present invention.

FIG. 6 shows an example of situation when a new sharing object has been inserted to introduce a sharing display function into the system, in the first embodiment of the present invention.

FIG. 7 is a schematic diagram illustrating the basic principle of object collaboration coupling in a second embodiment of the present invention.

FIG. 8 illustrates the concept of object collaboration before object collaboration coupling in the second embodiment of the present invention.

FIG. 9 illustrates the concept of object collaboration coupling in the second embodiment of the present invention.

FIG. 21 illustrates an example of a configuration, in which an object collaboration includes an object collaboration core portion and an object collaboration interface portion.

FIG. 25 illustrates the basic principle for searching an object collaboration by backward searching in an object collaboration apparatus of the ninth embodiment of the present invention.

FIG. 26 illustrates a DTD representing a message with an input or output message used in the ninth embodiment.

FIG. 27 shows an example of a message that the object searching portion 113 sends out in the first step in the ninth embodiment.

FIG. 28 shows an example of a message that the object searching portion 113 sends out in the second step in the ninth embodiment.

FIG. 29 shows an example of a message that the object searching portion 113 sends out in the third step in the ninth embodiment.

FIG. 30 shows an example of a message that the object searching portion 113 sends out when repeating the second step in the ninth embodiment.

FIG. 31 shows an example of a message that the object searching portion 113 sends out when repeating the third step in the ninth embodiment.

FIG. 32 shows an example of a message of requesting file conversion using the result obtained with FIG. 31 in the ninth embodiment.

FIG. 33 shows an example of a message returning the result of FIG. 32 in the ninth embodiment.

FIG. 34 shows an example of a message in which after receiving the result of FIG. 33, again, "imagearbiter.phx", which is a broker object, requests file conversion, in the ninth embodiment.

FIG. 35 indicates, like FIG. 34, that the file conversion has been terminated successfully, in the ninth embodiment.

BEST MODE FOR CARRYING OUT THE INVENTION

The following is a detailed description of preferred embodiments of an object collaboration apparatus in accordance with the present invention, with reference to the accompanying drawings.

The present invention relates to an object collaboration apparatus which perform collaboration processing between objects, such as communication, dialogue and cooperation between distributed objects. Individual computer systems serving as objects or individual application programs operating on computer systems perform certain processes in form of reactions in response to messages that are floated on a communication path defined as a shared field, and changing the reaction relation between messages and actions, the operation of the entire system can be changed in a flexible manner.

In the present invention, the relation among the collaborating objects is not so close that it depends on their internal state or internal functions, and functions can be built dynamically by object collaboration, in which the relation among the collaborating objects is flexible.

To understand the present invention better, the "awareness model" seen in human communication and collaboration behaviors is helpful. The present invention presupposes that information processing similar to the "awareness" existing between human individuals is performed by collaboration among distributed objects, and that the objects collaborate based on the detected "awareness." The following is an explanation of the collaboration of distributed objects based on the "awareness" analogy as presupposed in the object collaboration apparatus according to the present invention. Then, an explanation of approaches to make the collaboration of distributed objects more flexible follows, together with specific embodiments.

The following is an explanation of the collaboration of distributed objects based on the "awareness" analogy. The collaboration of distributed objects or computers based on the "awareness" analogy can be accomplished by the following configuration.

1. "Awareness" messages are being shared or "broadcasted."
2. Objects that receive an "awareness" message have their own relations for associating messages with actions.
3. In objects that send or receive the "awareness" message, the relations between messages and actions are separate.

Taking advantage of the nature of the "awareness" analogy, which is that a message and an action are separated or can be separated, makes it possible to add the two important elements of participation and intervention as an interaction between objects, thus increasing the degree of freedom for the collaboration between objects or between computers connected over a network.

Figure 1:
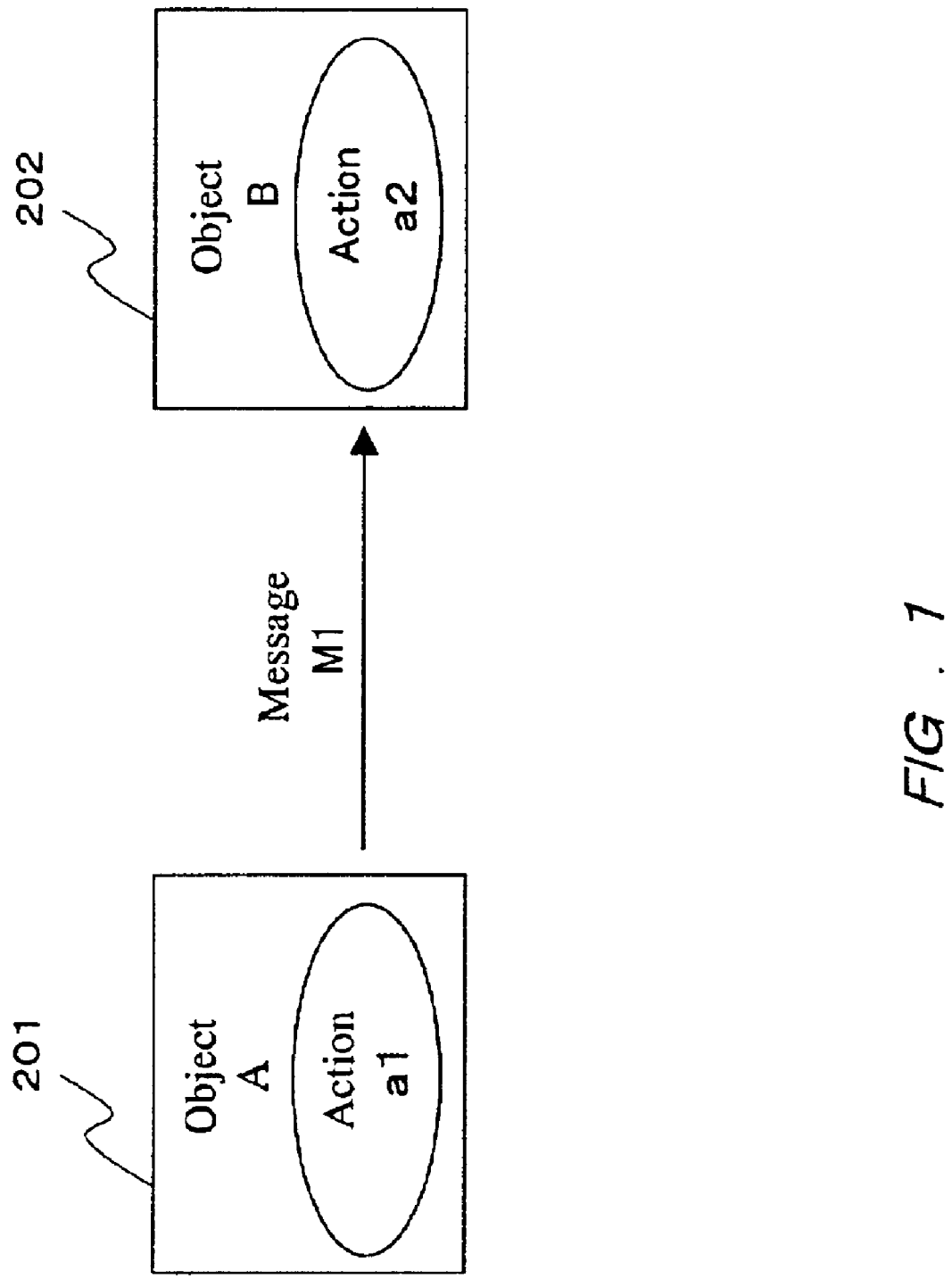
FIG. 1 is a schematic diagram of the loose collaboration between objects in the "awareness" analogy for the basic principle of the present invention.

FIG. 1 is a schematic diagram of the loose collaboration between objects in the "awareness" analogy.

In FIG. 1, numeral 201 indicates an object A and numeral 202 indicates an object B. Both objects are entities which send and receive "awareness" messages. M1 is a message, namely an "awareness" message. Further, a1 indicates an action specified in the object A (201) and a2 indicates an action specified in the object B (202). The arrow in FIG. 1 indicates the sending of a message in which the starting point is an object, and it shows a message reception in which the ending point is an object. Each object has its own action serving as the internal condition.

In FIG. 1, the object A (201) and the object B (202) collaborate via the message M1. In the "awareness" analogy, the object A (201) sends out a message basically without being concerned with the object B (202) or the internal function of the object B (202). Also, the object A (202) does not have to specify the object B (202) to send out a message. The object A (201) sends out the message M1 based on its own condition and processing contents. The object B (202) monitors messages floating on the communication channel, and when it detects the message M1, and if M1 is meaningful to the object B, it reacts and starts the action a2. In this way, the object A and the object B can carry out a meaningful collaboration, though this is not by a direct connection between the object A (201) and the object B (202), but by a connection between the message M1 and the action a2 of the object B (202). On the other hand, when the message is not M1, the object B (202) does not react unless this different message is in the same acceptance scope as the message M1, or there is an action corresponding to such a different message. Accordingly, since the objects collaborate loosely via messages, the degree of freedom of the collaboration between the objects increases. That is to say, there is no need for specifying the address of the recipient and the content for the processing request as in conventional computer network communication systems, and "awareness" messages indicating object conditions and processing results are floated on the network. Each terminal monitoring the network detects the messages, and reacts autonomously to them if a corresponding action is specified.

There is no necessity to impose any limitations on the communication channel in the awareness analogy, which can be not only a physical network, such as a LAN, but go through any medium in which mutual reception is possible, such as radio, sound, or light. The communication channel can also be a storage medium, such as a mutually accessible memory. Moreover, a virtual communication channel through port addresses of a communication channel is also possible.

The above is the basic principle for collaboration of distributed objects based on the awareness model.

The following is an explanation of an object collaboration apparatus of the present invention, applying an approach for making the collaboration of distributed objects even more flexible. In the object collaboration apparatus of the present invention, an approach is introduced to increase the flexibility of the collaboration of distributed objects based on the awareness analogy and dynamically change the collaboration relation of distributed objects. In the following first through fifth embodiment, the five approaches of collaboration insertion, collaboration coupling, external intervention in collaboration, receiver-side collaboration participation, and sender-side collaboration participation. The sixth embodiment illustrates an embodiment of an object collaboration apparatus having a collaboration condition setting function, in which collaboration conditions are included in the collaboration among objects, and collaboration among objects is carried out if these collaboration conditions are fulfilled. The seventh embodiment illustrates an embodiment of an object collaboration apparatus having an object collaboration relation presentation function, in which object collaboration relations are detected and explicitly displayed to the user. The eighth embodiment illustrates an embodiment of an object collaboration apparatus, in which the object collaborations include an object collaboration core portion, in which object collaboration relations are maintained in a core, and an object collaboration interface portion for interfacing collaboration between this object collaboration core portion and other objects, wherein, if a change in the object collaboration relation occurs, the relations of the object collaboration core portion are maintained as they are, and the object collaboration relations are changed by changing the collaboration destination of the object collaboration interface portion. The ninth embodiment illustrates an embodiment of an object collaboration apparatus having a function for forming object collaboration by searching an object forming the collaboration relation connecting an object serving as the starting point and an object serving as the ending point. The tenth embodiment illustrates an embodiment that is an example of a computer-readable storage medium storing a program including processing steps for realizing an object collaboration apparatus in accordance with the present invention.

First Embodiment

The first embodiment explains the basic principle of object collaboration insertion in a distributed object collaboration based on the awareness analogy, and an object collaboration apparatus, in which this principle is applied.

Here, "object collaboration insertion" means, given a series of object collaborations, inserting a new object collaboration relation with a different object into a portion of the object collaborations of this series. This means, that by separating a portion of this series of object collaborations, and organizing a collaboration relation between the objects at which the series was separated and another object to be inserted, a collaboration is caused from the object at the position before the separation of the series to the inserted new object, and a collaboration is caused from the inserted new object to the object at the position behind the separation of the series, organizing a new series of object collaborations.

Figure 2A:
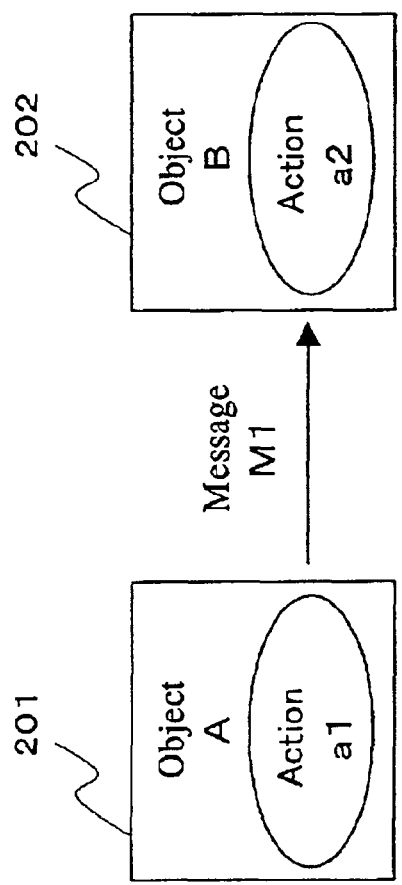
FIG. 2 is a schematic diagram illustrating the basic principle of object collaboration insertion in a first embodiment of the present invention.
Figure 2B:
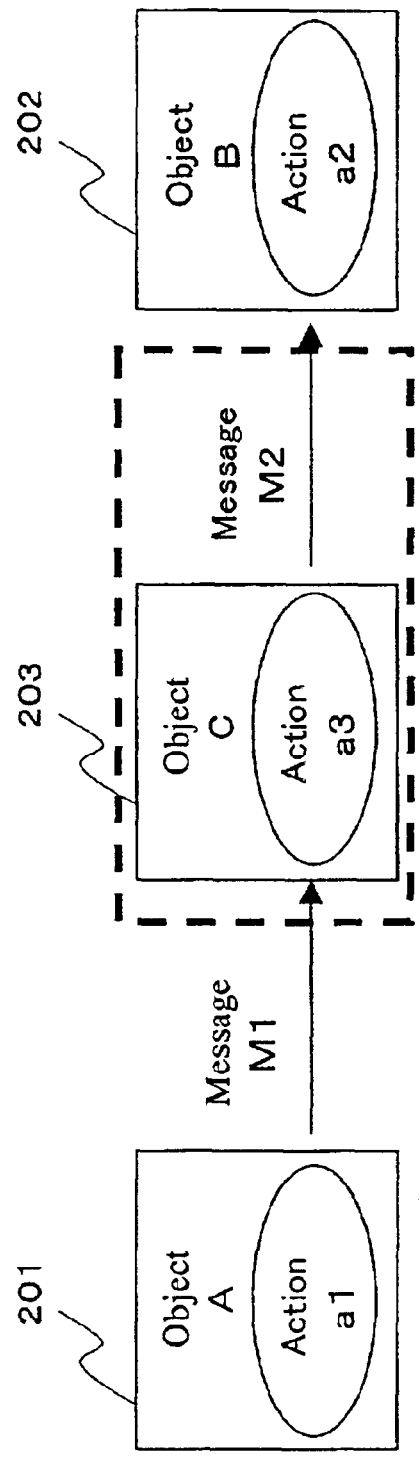

FIG. 2 is a schematic diagram illustrating the basic principle of object collaboration insertion. Objects, messages, and the objects' action portions are represented schematically. FIG. 2A illustrates the situation before object collaboration insertion. FIG. 2B illustrates the situation after object collaboration insertion. In FIG. 2, numeral 201 denotes an object A, numeral 202 denotes an object B, and numeral 203 denotes an object C. These objects are entities that can send and receive messages. M1 and M2 denote messages. Furthermore, a1 denotes an action defined in object A (201), a2 denotes an action defined in object B (202), and a3 denotes an action defined in object C (203). When the starting point of the arrows in the drawings of this and the following embodiments is an object, it denotes sending of a message, and when the ending point is an object, it denotes the receiving of a message. All objects have actions independently as internal states.

First of all, as shown in FIG. 2A, an object collaboration relation is organized via a message M1 between an object A (201) and an object B (202). As has been explained for the basic principle of object collaboration, this object collaboration is a flexible collaboration via the message M1. It is not necessary to specify a recipient address when sending the message M1, and sending objects can float messages on the network field (i.e. the communication media), whereas receiving objects monitor the network field and can input any of these messages. This means that the object A (201) does not have to be aware of the object B (202) and the action a2 to send a message M1 over the network. That is to say, it is irrelevant what kind of object collaboration there is.

By rewriting the reaction relation of messages/actions of object B (202), an object collaboration with object C (203) can be inserted, as shown in FIG. 2B. That is to say, the reaction relation of messages/actions of object B (202) is rewritten, and action a2 is defined as an action in reaction to the message M2. If, as the reaction relation of messages/actions held by the object C (203), a3 is taken as the action reacting to message M1 and a message M1 is sent by the action a3, then it is possible to insert a new object C (203) as an object collaboration relation.

Figure 3:
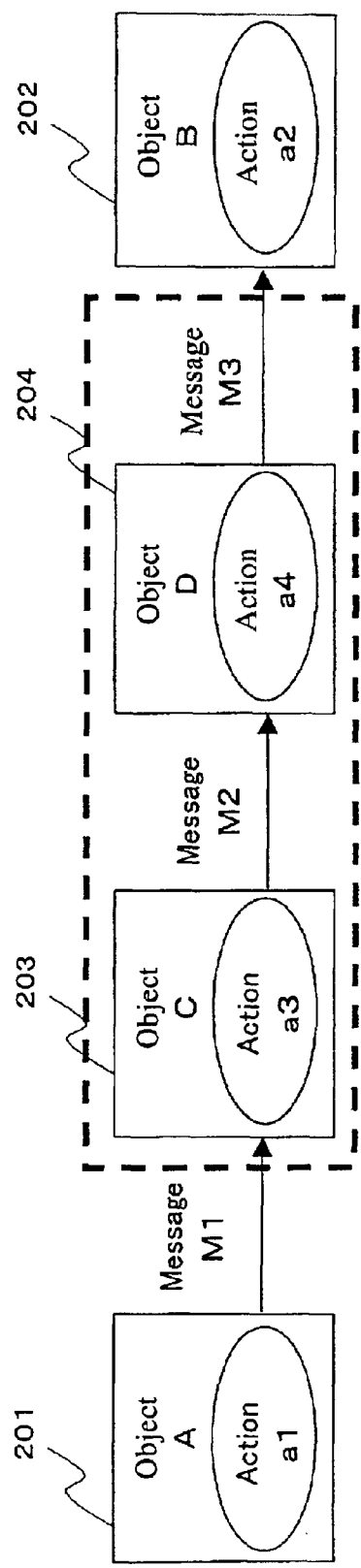
FIG. 3 is a schematic diagram illustrating multiple object collaboration insertion in a first embodiment of the present invention.

Needless to say, it is possible to cascade more than one object collaboration insertion. This situation is shown in FIG. 3. FIG. 3 shows a situation, in which two object collaboration insertions have been cascaded. Compared with FIG. 2A, in FIG. 3, an object C (203) and an object D (204) have been inserted into the object collaboration between the object A (201) and the object B (202) and the message/action reaction relation message M1→action a3→message M2→action a4→message M3→action a2 has been organized, accomplishing the collaboration of all objects.

Needless to say, the removal of object collaboration by the reverse process to object collaboration is also possible.

Figure 4:
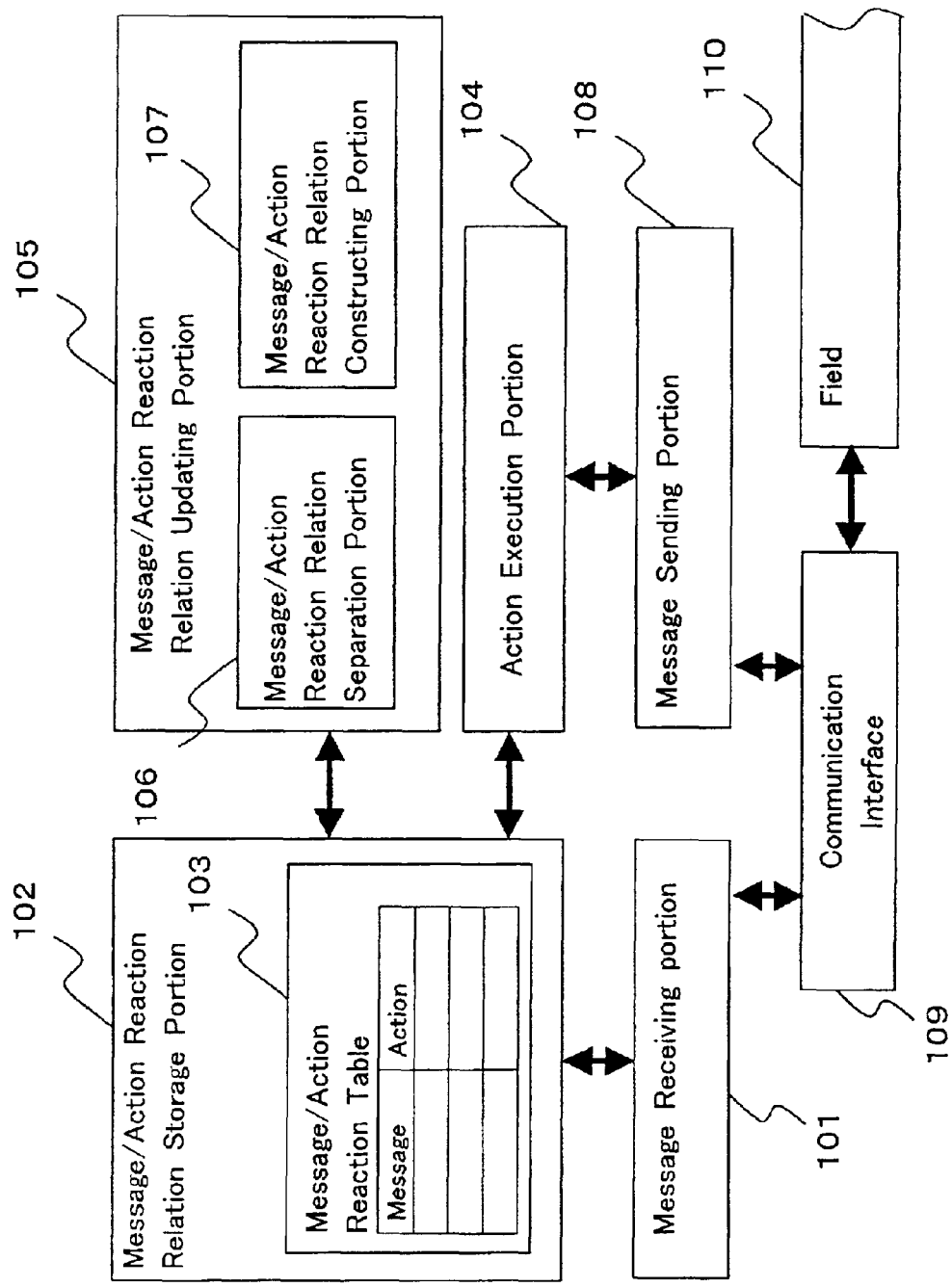
FIG. 4 is a block diagram of the general configuration of an object collaboration apparatus of the first embodiment of the present invention.

The following describes an object collaboration apparatus, in which the above-described basic principles of object collaboration are applied. FIG. 4 is a block diagram of the general configuration of such an object collaboration apparatus.

In FIG. 4, numeral 101 denotes a message receiving portion, which monitors and inputs messages sent over a network. Numeral 102 denotes a message/action reaction relation storage portion for storing the relation between messages and actions that are reactions to messages. The message/action reaction relation storage portion 102 includes a message/action reaction table (reaction table) 103 listing message/action reaction relations. The message/action reaction relation storage portion 102 compares the message pattern in the message/action reaction table (reaction table) 103 with the messages received by the message receiving portion 101, and when a received message matches with or is comprised in its message pattern, the corresponding action is executed. Numeral 104 denotes an action execution portion for executing a process in accordance with a specified action. Numeral 105 denotes a message/action reaction relation update control portion for controlling the updating of the message/action reaction relation stored in the message/action reaction relation storage portion 102 when it is necessary to update the message/action reaction relation. The message/action reaction relation update control portion 105 includes a message/action reaction relation separation portion 106 for separating the message/action reaction relation in the message/action reaction relation storage portion 102, and a message/action reaction relation organizing portion 107 that associates a specified action with a specified message.

Numeral 108 denotes a message sending portion for sending messages over the network when necessary, numeral 109 denotes a communication interface, numeral 110 denotes a field serving as a communication medium, and conceptually includes networks for communication among computers.

Taking a configuration for performing file sharing display as an example of a specific embodiment of an object collaboration apparatus in accordance with the present invention, the following explains how the object collaboration apparatus operates.

FIG. 5 illustrates the concept of object collaboration before object collaboration insertion in the first embodiment. Numeral 501 denotes a file displaying object without shared display function, and numeral 502 denotes a display object without shared display function. Both the file displaying object 501 and the display object 502 have the configuration shown in FIG. 4.

When the file displaying object 501 wants to display a file A on a display, it sends a message M3 via the message sending portion 108 and the communication interface 109 to the field 110. This message M3 can be for example (Display, FileA, x400, y300), which displays the File A with the XY coordinates (400, 300) as the starting point. Monitoring the field 110, the display object 502 displays and inputs the message M3 via the communication interface 109 with the message receiving portion 108.

FIG. 5B illustrates the message/action reaction table (reaction table) 103, which is kept by the message/action reaction relation storage portion 102 of the display object 502. On the left side, the table lists messages, and on the right side, the table lists the corresponding actions. Here, the message (Display, *, *, *) is listed, wherein "*" represents a wildcard, which can stand for any kind of content. That is to say, it corresponds to all messages having "Display" as the first item. The action "draw" specifies that the display object executes a drawing process on the display. When the display object 502 receives the message M3, it refers to the message/action reaction table 103, obtains the action "Draw", and the action execution portion 104 executes a drawing process.

The following explains the insertion of object collaboration. In this example, a shared display function is introduced into the system by introducing a new sharing as object and inserting a new object collaboration.

FIG. 6A shows the situation when a new sharing object 503 has been inserted. As shown in FIG. 6A, the collaboration among the objects is such that there is a collaboration from the file displaying object 501 to the display object 502, and then, a collaboration with a sharing object 503 has been inserted, including collaboration from the display object 502 to the sharing object 503 and back to the display object 502.

First, when information regarding an update of the message/action reaction relation is given, for example in accordance with user instructions or when it is necessary to improve the load conditions in a distributed object system, the message/action reaction relation update control portion 105 separates the message/action reaction relation in the message/action reaction relation storage portion 102 of the display object 502 with the message/action reaction relation separation portion 106. Here, this means that the relation between the message (Display, *, *, *) and the action (Draw) is cancelled, and the corresponding entry in the message/action reaction table 103 of the display object 502 can be temporarily cancelled. Then, the message/action reaction relation update control portion 105 organizes the message/action reaction table 103 shown in FIG. 6B in the display object 502 with the message/action reaction organizing portion 107. The action (Status) is associated with the message (Display, *, *, *), and new message/action reaction relations are added for the message (Display-shared, *, *, *) and the action (Shared draw) as well as for the message (Display-unshared, *, *, *) and the action (Unshared draw). Furthermore, the message/action reaction relation update control portion 105 organizes the message/action reaction table 103 shown in FIG. 6C in the display object 503 with the message/action reaction organizing portion 107. A new message/action correspondence relation is added for the message (Check-status, *, *, *) and the action (Share).

Updating the message/action reaction tables 103 like this, the operation of the object collaboration apparatus is as follows. First, the file displaying object 501 sends out a message M3 (Display, File-A, x400, y300), the display object 502 reacts in accordance with the message/action reaction table 103, and the action "Status" is executed. In this example, the action "Status" is programmed such that a message M4 (Check-status, File-A, x400, y300) is sent out to the field 110. Then, the sharing object 503, which is monitoring the field 110, inputs the message M4 via the communication interface 109 and the message receiving portion 108. The sharing object 503 reacts in accordance with the message/action reaction table 103 shown in FIG. 6C and executes the action "Share". Here, the action "Share" means that it is checked whether the File-A, which is specified as the second item of the message M4, is a shared file. If it is a shared file, the user is notified over the display that the file is a shared file and a message M5 (Display-shared, File-A, x400, y300) is sent out, and if it is not a shared file, the user is notified over the display that the file is not a shared file and a message M6 (Display-unshared, File-A, x400, y300) is sent out. In the example in FIG. 5A, File A is a shared file, and the sharing object 503 sends out the message M5 (Display-shared, File-A, x400, y300). The display object 502 reacts in accordance with its message/action reaction table 103, and executes the action "Draw".

As shown above, in the object collaboration apparatus with the configuration in FIG. 5, which does not include a share state display, a share state display is made possible by collaboration with a sharing object 503, which is accomplished by object collaboration insertion in accordance with the present invention as shown in FIG. 6.

An aspect that merits attention is firstly, no changes at all have been added to the file displaying object 501, which requested the file display. Secondly, changes to the display object 502 can be applied dynamically during operation. In object collaboration by conventional programming technology, changes to the display object 502 make it necessary to recompile the program code, and to change the functions of file displaying object 501, but with the object collaboration insertion method of the present invention, these operations become unnecessary, and insertions and changes to the collaboration relation among a plurality of objects can be carried out in an easy and flexible manner.

Second Embodiment

The second embodiment explains the basic principle of object collaboration coupling in distributed object collaboration, and an object collaboration apparatus, in which this principle has been applied.

Object collaboration coupling means that when two object collaborations exist independently from one another, a new object collaboration relation is organized, fulfilling the role of a bridge coupling the two object collaborations, and the two independent object collaborations are turned into one series of object collaborations. That is to say, a new object collaboration is inserted, continuing one of the two object collaborations, and this new object collaboration is then caused to collaborate with the other of the two object collaborations.

FIG. 7 is a schematic diagram illustrating the basic principle of object collaboration coupling. As in FIG. 5, objects, messages, and the objects' action portions are represented schematically. FIG. 7A illustrates the situation before object collaboration coupling, in which the object collaborations are independent from one another. FIG. 7B illustrates the situation after object collaboration insertion. In FIG. 7, numerals 701 to 705 denote object A to object E, and M7 to M10 denote messages.

In FIG. 7A, the object A 701 and the object B 702 collaborate via the message M7, and the object C 703 and the object D 704 collaborate via the message M8. The object B 702 may send out the message M9 in a certain action, but the objects C 703 and D 704 do not react. Here, the object C 703 reacts to the message M10. Thus, the two object collaborations are independent from one another, and they are not in an object collaboration relation.

As shown in FIG. 7B, an object E 705 having a new message/action reaction relation is added, coupling the two independent object collaborations. If the object E 705 starts the action a5 in reaction to the message M9, and sends out the message M10 to the field, then the message M9, which is sent out after object collaboration between the object A 701 and the object B 702 (that is, one of the above-mentioned object collaborations), is inputted by the object E 705, the message M10 is sent onto the field via the action a5, and an object collaboration between the object C 703 and the object D 704 (that is, the other of the above-mentioned object collaborations) is started in reaction to the message M10. Thus, the object collaborations that were independent in FIG. 7A are coupled into one series of object collaborations as shown in FIG. 7B. This is the basic principle of object collaboration coupling.

Next, an embodiment of an object collaboration apparatus in accordance with the present invention, in which the basic principle of object collaboration coupling is applied, is explained below.

The following explanations take a memo transfer service as a specific example.

In the block diagrams showing the general configuration of this object collaboration apparatus, detailed explanations regarding aspects that have been covered by FIG. 4 have been omitted.

FIG. 8 illustrates the concept of object collaboration before the object collaboration coupling in the second embodiment. Numeral 801 denotes a first memo sending object, numeral 802 denotes a first memo receiving object, displaying received content on a display, numeral 803 denotes second memo sending object, and numeral 804 denotes a second memo receiving object, displaying received content on a display. Here, there are two independent object collaborations, namely the object collaboration between the first memo sending object 801 and the first memo receiving object 802, and the object collaboration between the second memo sending object 803 and the second memo receiving object 804.

Let's consider the case that a memo sender S sends a memo 1 consisting of a file B to a memo recipient R using the first memo sending object 801. Ordinarily, the memo sender S uses a computer in which the first memo sending object 801 is present, and starts an action of sending a message M11. The message M11 has the format (Memo, user-S, user-R, File-B). The message receiving object 802 of the computer used by the memo recipient R has the message/action reaction table shown in FIG. 8B, which keeps a message/action correspondence relation between the message (Memo, *, *, *) and the action (Show memo). When the memo receiving object 802 reacts to the message M11, the action (Show memo) is started, and the file B is displayed on the display of the computer used by the memo recipient R.

Now let's assume that the memo recipient R is out, that is, at a distance location. In that case, the memo recipient R cannot receive the memo with the above object collaboration only. Let's further assume that there is a computer at the location to which the memo recipient R went, and that in this environment there is an object collaboration between the second memo sending object 803 and the second memo receiving object 804, and a display controlled by the second memo receiving object can be seen the memo recipient R.

Object collaboration coupling can be carried out as shown in FIG. 9A. Before the memo recipient R leaves, a new object collaboration is organized, coupling the object collaboration to the second memo receiving object 804, so that received memos are forwarded. The memo recipient R updates the message/action reaction relation between the message (Memo, *, *, *) and the action (Ask transfer) from the message/action reaction table 103 in FIG. 8B to the one FIG. 9B with the message/action reaction relation update control portion 105 of the object collaboration apparatus on which the first memo receiving object 802 is located, organizes a new transfer object 805, and organizes in its message/action reaction relation storage portion 102 a message/action reaction table 103 associating the message (Transfer, *, *, *) with the action (Send) as shown in FIG. 9C, with the message/action reaction relation organizing portion 107 of the transfer object 805.

On the other hand, the second memo receiving object 803 keeps the message/action reaction table 103 shown in FIG. 9D, and the second memo receiving object 804 keeps the message/action reaction table 103 shown in FIG. 9E.

The following explains how the coupling of the thusly organized object collaboration works.

First, the memo sender S uses a computer on which the first memo sending object 801 is present, and starts an action of sending out a message M11 (Memo, user-S, user-R, File-B). This aspect is the same as in FIG. 8A. In reaction to the message M11, the memo receiving object 802 of the computer used by the memo recipient R executes the action "Ask transfer" in accordance with the message/action reaction relation in FIG. 9B. Here, the action "Ask transfer" outputs a message M12 requesting for a transfer of the File-B, which is specified as the fourth item in message M11. The message M12 has the format (Transfer, user-S, user-R, File-B). In response to the message M12, the transfer object 805 starts the action "Send" in accordance with the message/action reaction table shown in FIG. 9C. The action "Send" sends out a message M13 transferring the File-B, which is specified as the fourth item in message M12. For the transfer, it is also possible that the memo is transferred to a range that is restricted to the computer at the location to which the memo recipient R went or to a network including that computer. The message M13 has the format (Ask-show, user-S, user-R', File-B). The third item user-R' indicates the transfer destination. The second message sending object 803 of the computer at the location to which the memo recipient R went has the message/action reaction table shown in FIG. 9d, with a message/action correspondence relation associating the message (Ask-show, *, *, *) with the action (Request show). In response to the message M13, the memo sending object 803 starts the action (Request-show), and the memo is sent in a message M14. The second message receiving object 804 located on the computer at the location to which the memo recipient R went, has the message/action reaction table shown in FIG. 9E, with a message/action correspondence relation associating the message (Memo, *) with the action (Show memo). In response to the message M14, the second memo sending object 804 starts the action (Show memo), and the File B is displayed on a display of the computer at the location to which the memo recipient R went.

Thus, it is possible to take two independent object collaborations as shown in FIG. 8A, and couple the object collaborations together as shown in FIG. 9A, so as to organize a series of object collaborations.

Here, the class of the first memo sending object 801 and the first memo receiving object 802 shown in FIG. 8 do not have to be the same as the class of the second memo sending object 803 and the second memo receiving object 804, as long as they operate according to the basic principle shown in FIG. 1. Consequently, the equipment, OS, and mark-up language with which the classes of the memo sending objects and the memo receiving objects are actually operated can be independent. When messages are exchanged as in FIG. 1, the messages do not necessarily all have to be of the same format, and it is also possible to provide the transfer object 805 between the two classes shown in FIG. 9 with a conversion function for converting between the two formats.

Another aspect that merits attention in the object collaboration apparatus for memo transfer in accordance with the present embodiment is the fact that no changes at all have been added to the first memo sending object 501, which requested the memo transfer. Secondly, changes to the second sending object 802 and the transfer object 805 can be applied dynamically during operation. In object collaboration by conventional programming technology, changes to the second sending object 802 and the transfer object 805 make it necessary to recompile the program code, and to change the functions, but with the object collaboration coupling method of the present invention, these operations become unnecessary, and the coupling and changing of the collaboration among a plurality of independent objects becomes easier and more flexible.

Third Embodiment

The third embodiment explains the basic principle of external intervention in distributed object collaboration, and an object collaboration apparatus, in which this principle has been applied.

Figures 10A, 10B:
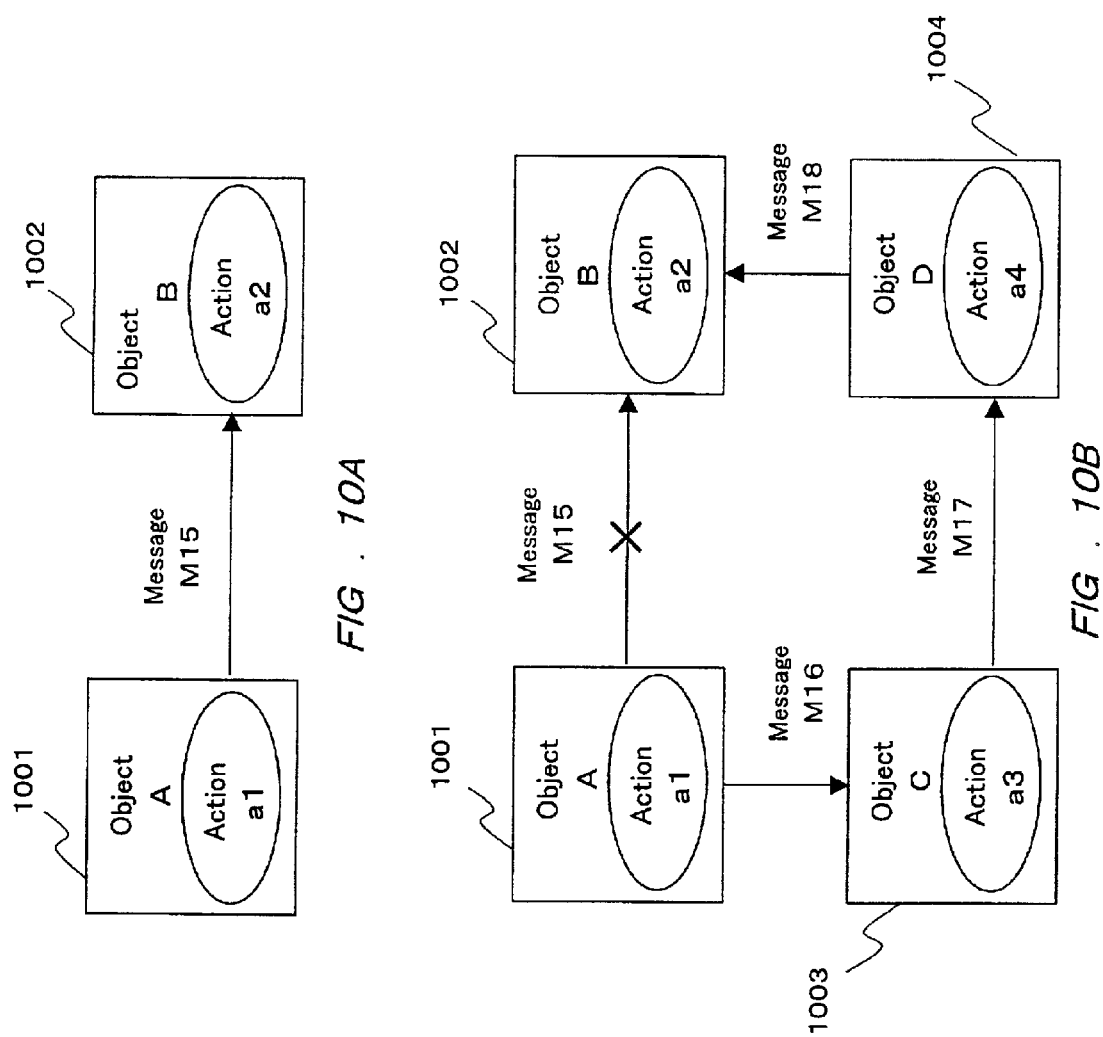
FIG. 10 is a schematic diagram illustrating the basic principle of external intervention of object collaboration in a third embodiment of the present invention.

External intervention in object collaboration means that an object externally intervenes in object collaboration of a given message/action reaction relation. The original message/action reaction relation is disrupted, and after automatically detecting the object collaboration flow and executing a predetermined action, the object collaboration flow is returned to the original object, and the process of intervention by insertion of object collaboration as described in the first embodiment is schematically expressed by intervention with an external object. The explanations for the process of intervention by multiple insertion of object collaboration as described in the first embodiment have been abridged where appropriate. As can be seen in the example of external intervention shown in FIG. 10, external intervention in object collaboration includes three steps. In a first step, the message/action relation in the object A is disrupted, in a second step, the object collaboration destination is replaced, and in a third step, intervention is executed with a coupled external object with a new message/action relation. With this external intervention, a function that did not exist in object A is added by interaction with an external object B. As becomes clear from the example in FIG. 10, the separation of messages and actions opens the possibility of interaction with new objects. Seen under the "awareness" analogy, the degree of freedom in the flexible collaboration of distributed objects results from the possibility of separating links between messages and actions and coupling then back together.

The following is an explanation of an embodiment of an object collaboration apparatus in accordance with the present invention, applying the basic principle of external intervention in object collaboration.

The request and reply of tasks is taken as a specific example. In particular, object groups that could perform only monotonous reactions in response to an initial external load execution request are taken as an example for a dynamical change to realize collective load distribution.

In the block diagrams showing the general configuration of this object collaboration apparatus, detailed explanations regarding aspects that have been covered by FIG. 4 have been omitted.

Figure 11:
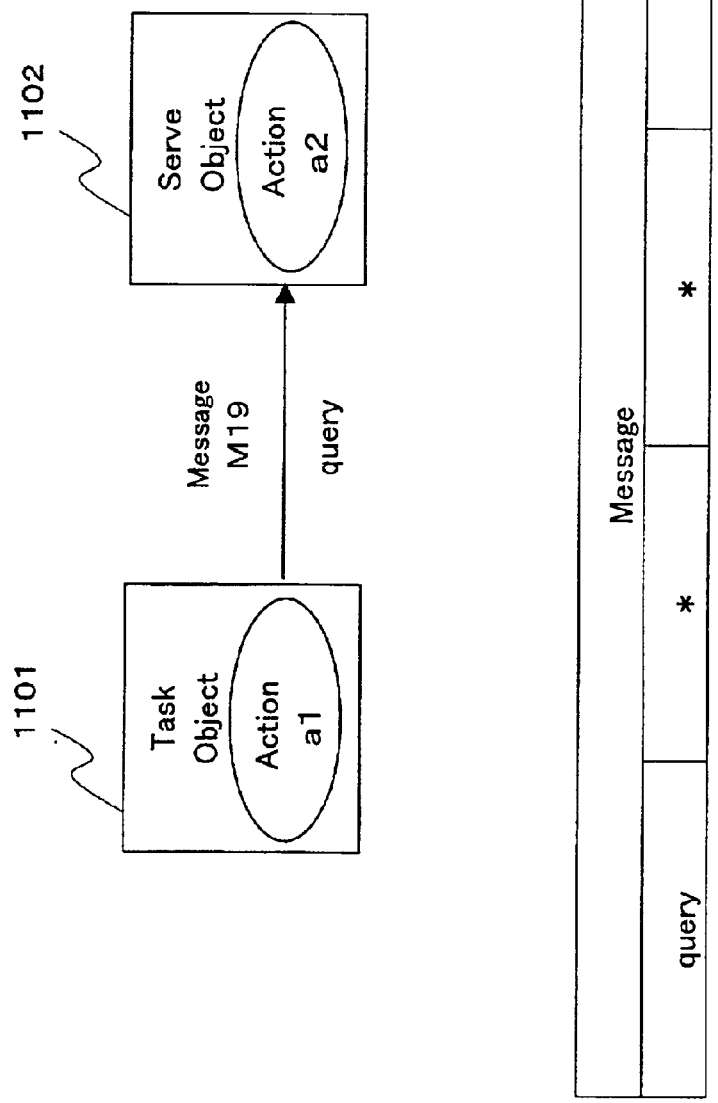
FIG. 11 illustrates the concept of object collaboration before external intervention of object collaboration in the third embodiment of the present invention.

FIG. 11 illustrates the concept of object collaboration before the external intervention in object collaboration of the third embodiment, and is an example of a monotonous reaction in response to a load. In this example, an action of a task object 1101 floats a message M19 ("query") on the field. Receiving this message, a serve object 1102 reacts, which has the message/action pair "query-serve" in its message/action reaction table. In the example shown in FIG. 11, when there is a plurality of serve objects 1102 that react to the message "query", these serve objects 1102 execute the action "Serve" independently.

Figure 12:
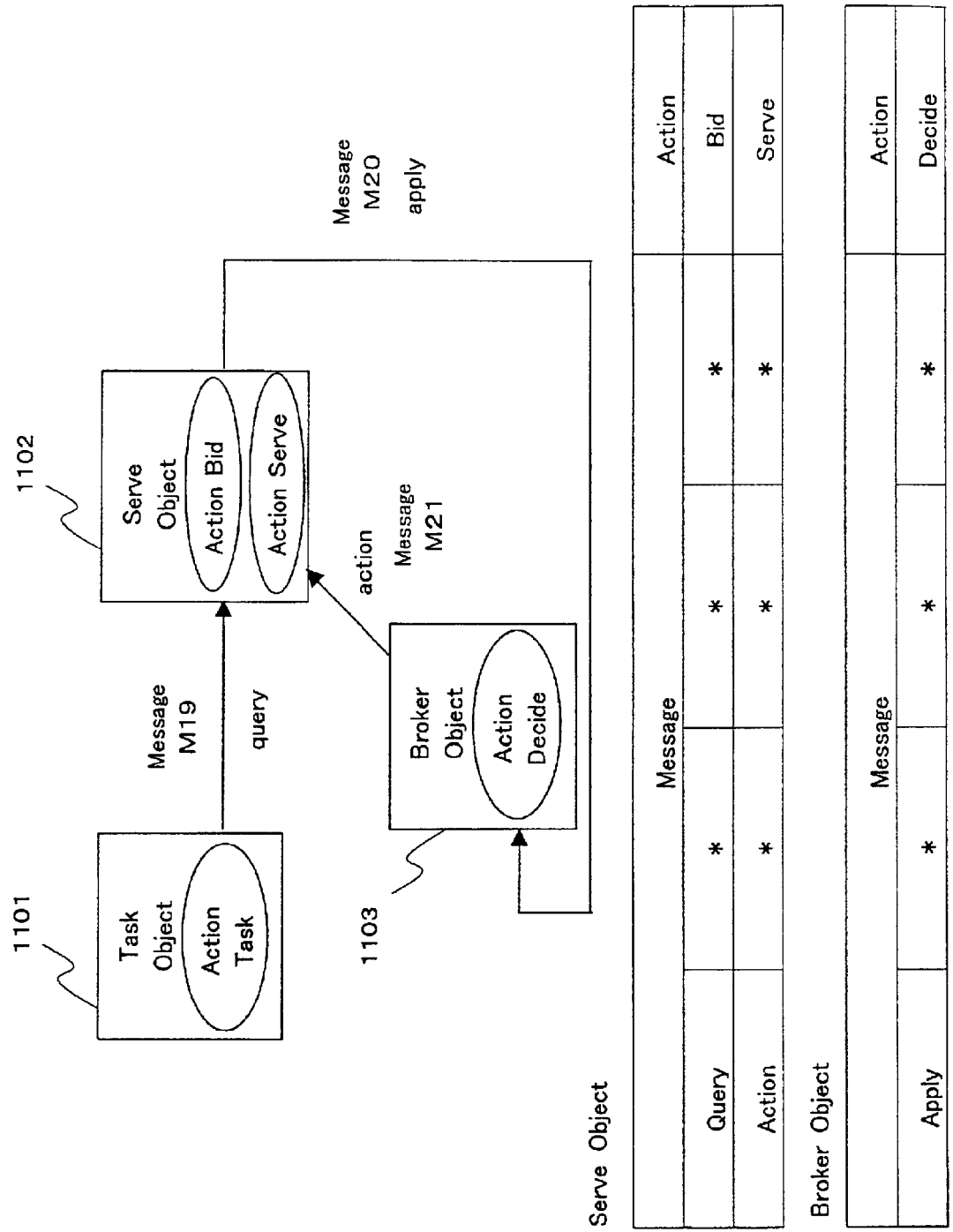
FIG. 12 illustrates the concept of external intervention of object collaboration in the third embodiment of the present invention.

FIG. 12 illustrates the concept of object collaboration by external intervention in object collaboration of the third embodiment. A broker object 1103 serving as the external object rewrites the message/action reaction table of the serve object 1102, disrupts the message/action object collaboration of message "query" and action "serve" shown in FIG. 11, and intervention of the broker object 1103 updates the object collaboration to "query (M19)"→"Bid"→"apply (M20)"→"Decide"→"action (M21)"→"Serve".

With this external intervention in object collaboration the task object also sends a "query" message, as in FIG. 11, but the serve object 1102 does not simply react to this message "query", but sends a "Bid" to the broker object 1103, and starts the action "Serve" only after receiving a "Decision". Consequently, providing the broker object with a function for selecting among two or more competing serve objects 1102, it becomes possible to provide a low load serve object 1102 with a function for distributing loads such as executing a "query" from the task object 1101. The important aspect is that it is not necessary to anticipate the state of object collaboration of FIG. 12 in the system design, and after designing the simple object collaboration state of FIG. 11, it is possible to expand the design to the system in FIG. 12, adding new broker objects as necessary. In object collaboration by conventional programming technology, changes to the task object 1101 and the serve object 1102 make it necessary to recompile the program code and to change the functions, but with the object collaboration external intervention method of the present invention, these operations become unnecessary, and changes to the collaboration relation due to intervention in an external object becomes easier and more flexible.

Fourth Embodiment

The fourth embodiment explains the basic principle of receiver-side collaboration participation in distributed object collaboration based on the "awareness" analogy, and an object collaboration apparatus, in which this principle has been applied.

Receiver-side collaboration participation means, given an object collaboration associated with a certain message, organizing a new object collaboration and participating in the afore-mentioned object collaboration by adding a message/action reaction relation that lets other objects react to this message. That is to say, it becomes possible that a plurality of objects participate, reacting to an object collaboration in response to one awareness message.

Figure 13:
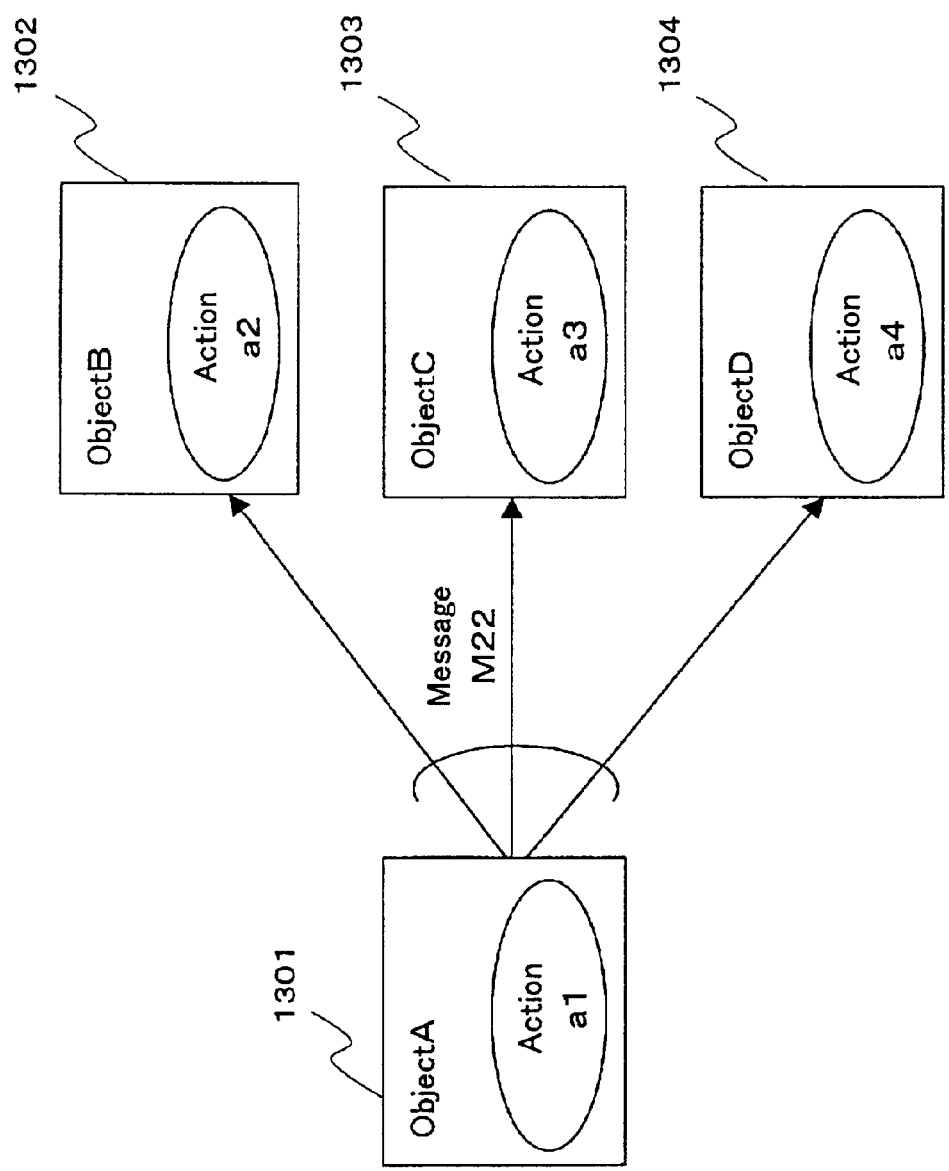
FIG. 13 is a schematic diagram illustrating the basic principle of receiver-side participation in object collaboration in a fourth embodiment of the present invention.

FIG. 13 illustrates the basic principle of receiver-side participation in object collaboration, and shows a situation, in which objects B (1302), C (1303), and D (1304) all react independently to a message M22 sent by an object A (1301). Of course, the actions in the objects B (1302), C (1303), and D (1304) can be the same or they can be different. Also, for the object B (1302), it does not matter whether the other objects C (1303) and D (1304) are present or not. Consequently, addition and elimination of the objects B (1302), C (1303), and D (1304) in FIG. 13 is nothing but the creation and destruction of applications by participation of new objects and their withdrawal.

Figure 14:
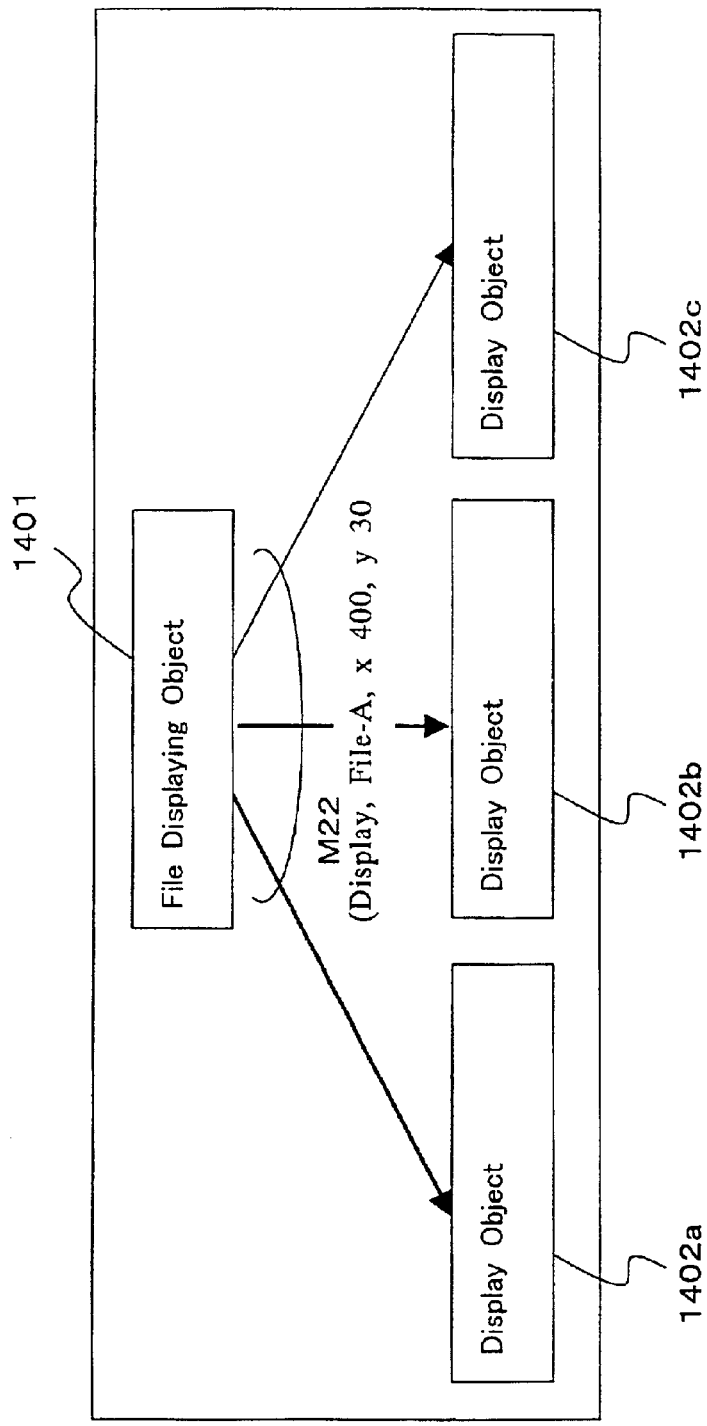
FIG. 14 illustrates an object collaboration apparatus of the present invention, in which the basic principle of receiver-side participation of object collaboration of the fourth embodiment of the present invention is applied.

FIG. 14 illustrates an embodiment of an object collaboration apparatus of the present invention, in which the basic principle of receiver-side participation of object collaboration is applied. FIG. 14 is an example of receiver-side participation in the example of the displaying of a file described with FIG. 5 of the first embodiment. As in the first embodiment, a file displaying object 1401 sends a message M22 (Display, FileA, x400, y300) via the message sending portion 108 and the communication interface 109 to the field 110, in order to execute a process for displaying the file A on a display. On the field 110, there are the three display objects 1402a to 1402c having the message/action reaction table 103 shown in FIG. 14B for reacting to the message M22. These display objects 1402a to 1402c monitor the field 110 and detect and input messages M22 floating on the field.

Here the three display objects 1402a to 1402c react to the message M22 (Display, FileA, x400, y300) and each executes the action "Draw" to display the file A on a display. The objects 1402a, 1402b, and 1402c can of course have different actions for different machines, which means that the display controlled by the objects does not have to be the same display, and the display format and display content does not have to be identical.

Thus, taking an object collaboration having an action in response to a certain message, receiver-side participation of object collaboration is possible by parallel addition of objects having actions corresponding to the same message.

Fifth Embodiment

The fifth embodiment explains the basic principle of sender-side collaboration participation in distributed object collaboration based on the "awareness" analogy, and an object collaboration apparatus, in which this principle has been applied.

Sender-side collaboration participation means, given an object collaboration associated with a certain message, another object organizes a new object collaboration and participates in the afore-mentioned object collaboration on the sender side by sending this message onto the field 110. That is to say, it is possible that for an object collaboration in response to one awareness message, a plurality of objects send the same message and participate.

Figure 15:
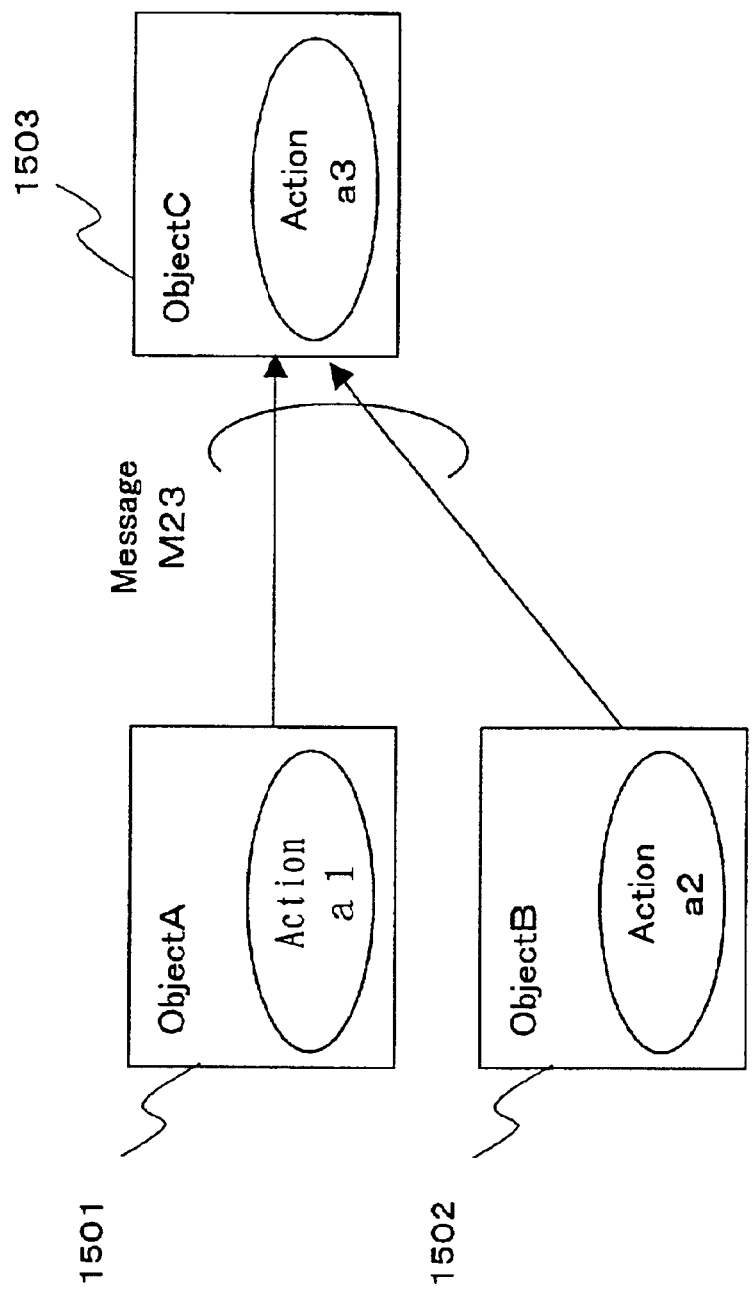
FIG. 15 is a schematic diagram illustrating the basic principle of sender-side participation in object collaboration in a fifth embodiment of the present invention.

FIG. 15 illustrates the basic principle of sender-side participation of object collaboration. As shown in FIG. 15, the objects A (1501) and B (1502) send out identical messages M23, and the object C (1503) and the messages M23 are associated with one another. In this case, the object C (1503) responds and starts an action, regardless whether the message M23 has been sent from the object A (1501) or whether it has been sent from the object B (1502). This means that in the collaboration of objects, participation on the sender side is acceptable. In other words, it can be said that object B (1502) intervenes on the sender side in the collaboration between object A (1501) and object C (1503).

Thus, taking an object collaboration having an action in response to a certain message, sender-side participation of object collaboration is possible by parallel addition of objects having actions that send out the same message.

Figures 16A, 16B:
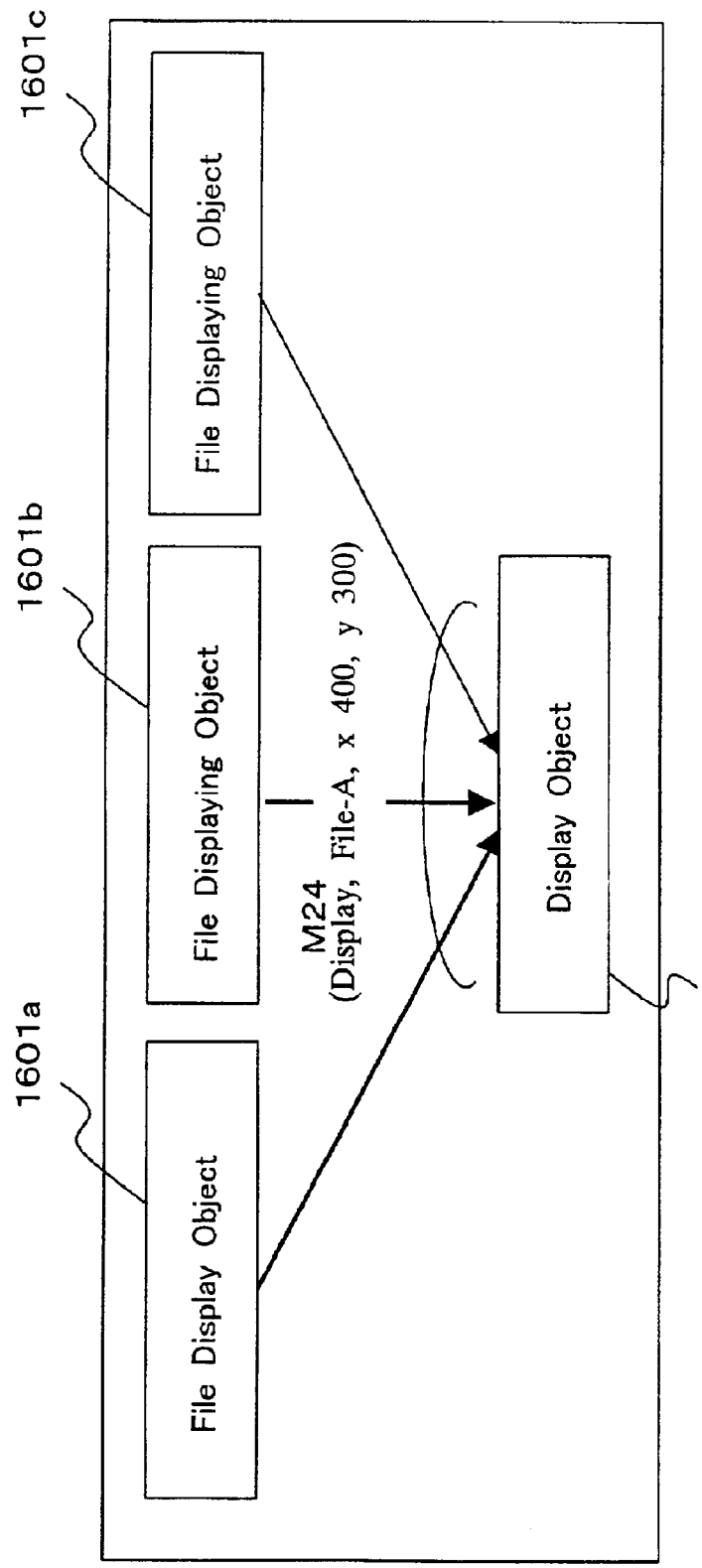
FIG. 16 illustrates an object collaboration apparatus of the present invention, in which the basic principle of sender-side participation of object collaboration of the fifth embodiment of the present invention is applied.

FIG. 16 illustrates an embodiment of an object collaboration apparatus in accordance with the present invention, in which the basic principle of sender-side participation of object collaboration is applied. FIG. 16 is an example of receiver-side participation in the example of the displaying of a file described with FIG. 5 of the first embodiment. As in the first embodiment, a file displaying object 1601a sends a message M24 (Display, FileA, x400, y300) via the message sending portion 108 and the communication interface 109 to the field 110, in order to execute a process for displaying the file A on a display. In addition to the file displaying object 1601a, there are the file displaying objects 1601b and 1601c on the field 110, sending out messages M24 as actions. The display object 1602 monitors the field 110 and detects and inputs messages M22, so that there are three sender-side objects. Here, the display object 1602 keeps the message/action reaction table 103 shown in FIG.

5B, executes the action "Draw" in response to the message M24, and displays the file that has been sent from the sender-side objects 1601a to 1601c on a display.

Thus, taking an object collaboration having an action in response to a certain message, sender-side participation of object collaboration is possible by parallel addition of sending objects having actions that send out the same message.

Sixth Embodiment

An object collaboration apparatus of the sixth embodiment of the present invention further includes a message/action reaction condition setting portion. Message/action reaction conditions for executing actions in response to received messages are set for each object, so that the message/action reaction relation storage portion stores message/action reaction relations in association with message/action reaction conditions, and the action execution portion executes actions in response to received messages if the message/action reaction conditions are fulfilled.

Figure 17:
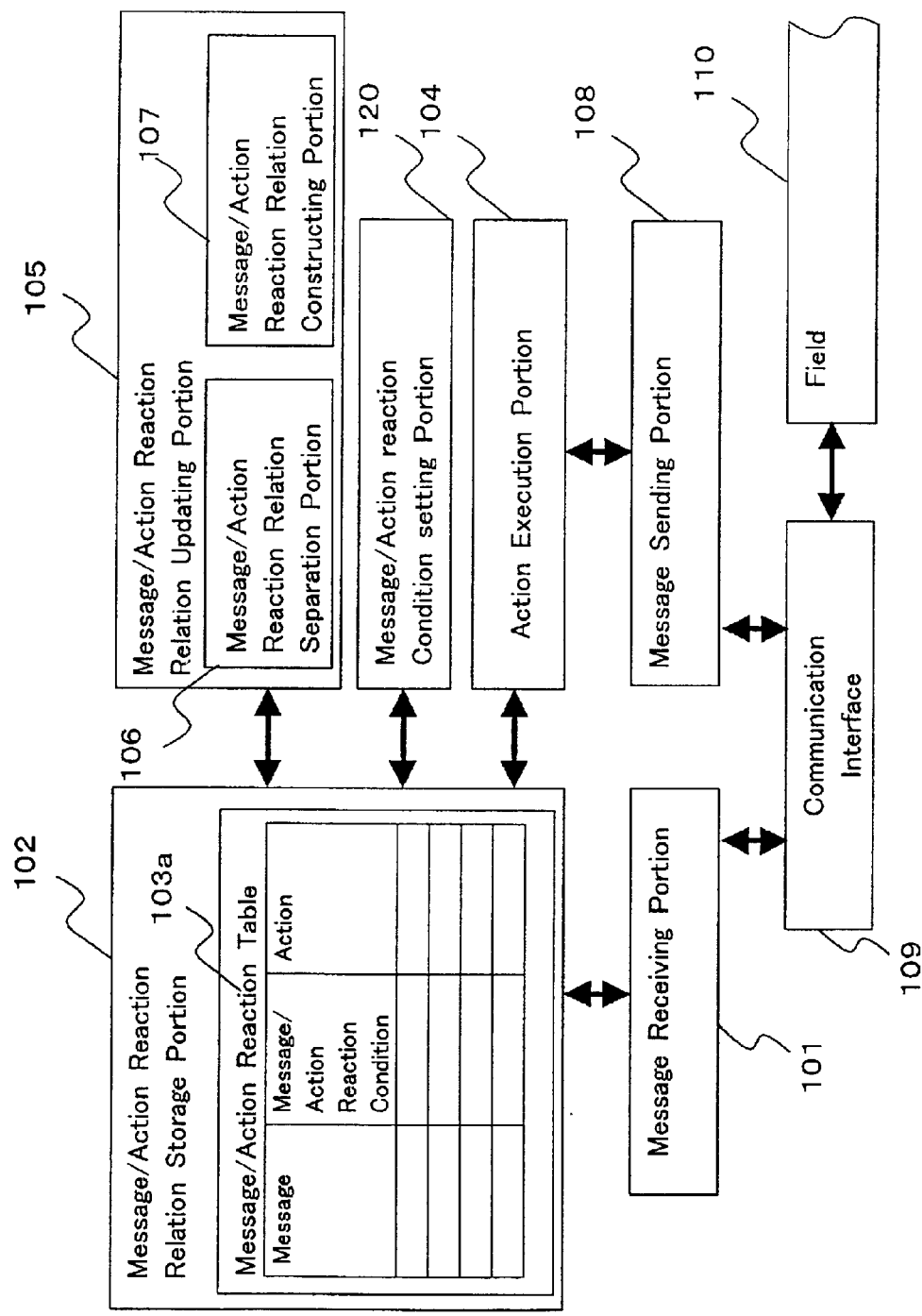
FIG. 17 is a block diagram showing the general outline of an object collaboration apparatus according to a sixth embodiment of the present invention.

FIG. 17 is a block diagram showing the general outline of an object collaboration apparatus according to the sixth embodiment. As shown in FIG. 17, an object collaboration apparatus according to the sixth embodiment includes a message/action reaction condition setting portion 120. In addition to actions associated with messages, the message/action reaction table 103a of the message/action reaction relation storage portion 102 also associates message/action reaction conditions for executing these message/action reactions. The message/action reaction conditions are set by the message/action reaction condition setting portion 120. The set message/action reaction conditions can be for example whether certain message parameters are within a set range, or whether the object platform environment, such as the load conditions, is within a set range. Other structural elements that are the same as in the first to fourth embodiments have been marked by the same numerals, and their further explanation has been omitted.

Figure 18:
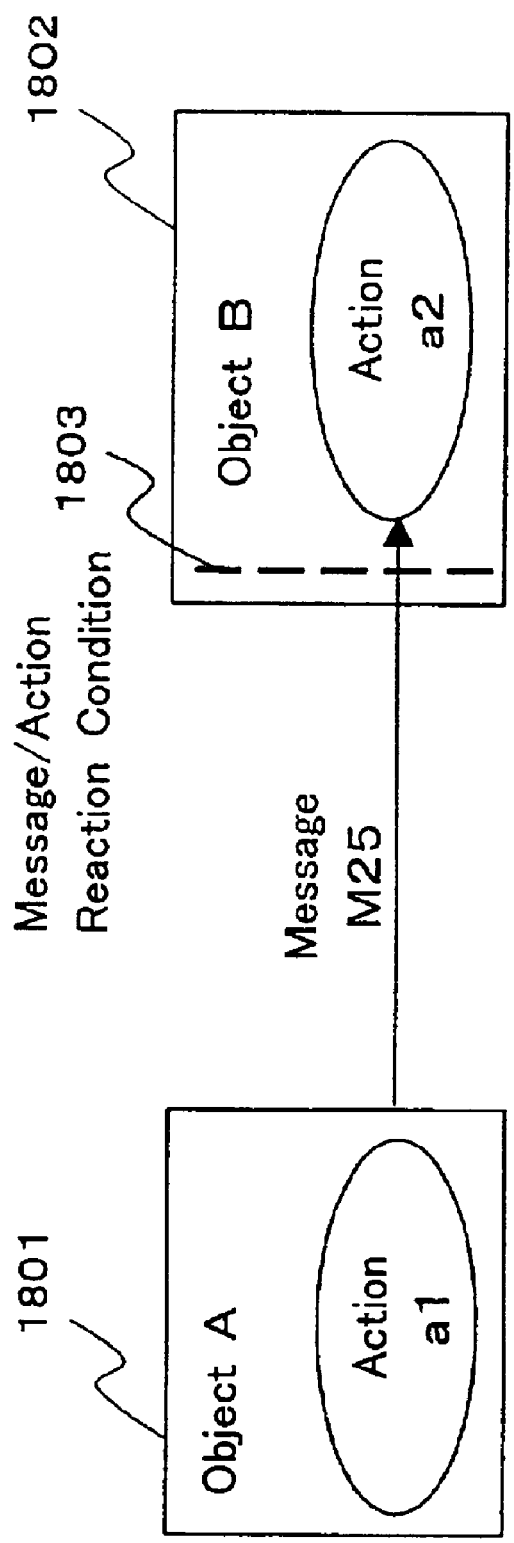
FIG. 18 illustrates the concept of collaboration among objects in an object collaboration apparatus of the sixth embodiment of the present invention.

FIG. 18 illustrates the concept of collaboration among objects in an object collaboration apparatus of the sixth embodiment, schematically illustrating the function of the message/action reaction conditions. As shown in FIG. 18, the object B 1802 is provided with a message/action reaction condition 1803, which functions conceptually like a filter for received messages. Messages are accepted only if the condition is fulfilled, and acceptance is denied if the condition is not fulfilled. After the message M25 sent from the object A 1801 has been received by the object B, it is checked whether the message/action reaction condition 1803 is fulfilled. What kind of message/action reaction condition is set will depend on the circumstances. For example, it is possible to set a condition with regard to the load ratio of the platform of the object that received the message. When the reaction condition is that the load ratio is not higher 0.5, then an action reaction is not performed in an object with a large load whose load ratio is larger than 0.5, even if an action in response to the received message is listed in the message/action reaction table 103a, because the given message/action reaction condition is not fulfilled.

By providing message/action reaction conditions, the following effects can be attained.

Firstly, the message/action reaction relation can be expressed more flexibly. In actual operation, processes and controls that the user wants to perform can be complicated and depend on specific conditions, so that it may be difficult to list all relations between messages and actions in a one-to-one form. With the object collaboration apparatus of the present invention, it is easy to list processes and controls for actual operations that may be complicated and depend on specific conditions, using the message/action reaction table 102.

Secondly, it is possible to realize load distributed processing that balances all object collaboration apparatuses forming a network on the field 110. If the relations between messages and actions are listed only in a one-to-one form, then an action is started when receiving a message listed in the message/action reaction table. No consideration is given to the operating conditions of the receiving object. Objects listing reactions to messages that are frequently sent off by many objects will frequently perform actions, and it is conceivable that temporary overloads occur, in which the loads concentrate. With the object collaboration apparatus of the sixth embodiment, it is possible to prevent load concentrations by providing an upper limit of the load ratio as a message/action reaction condition, thereby accomplishing a balanced load distribution. Furthermore, with the object collaboration apparatus of the sixth embodiment, it is also possible to realize a logical AND operation to execute an action when two specific messages have been received.

Seventh Embodiment

In the seventh embodiment of the present invention, the object collaboration relations in a distributed object collaboration apparatus are explicitly indicated to the outside by icons representing objects and a visual chart expressing object collaboration relations by link lines.

Figure 19:
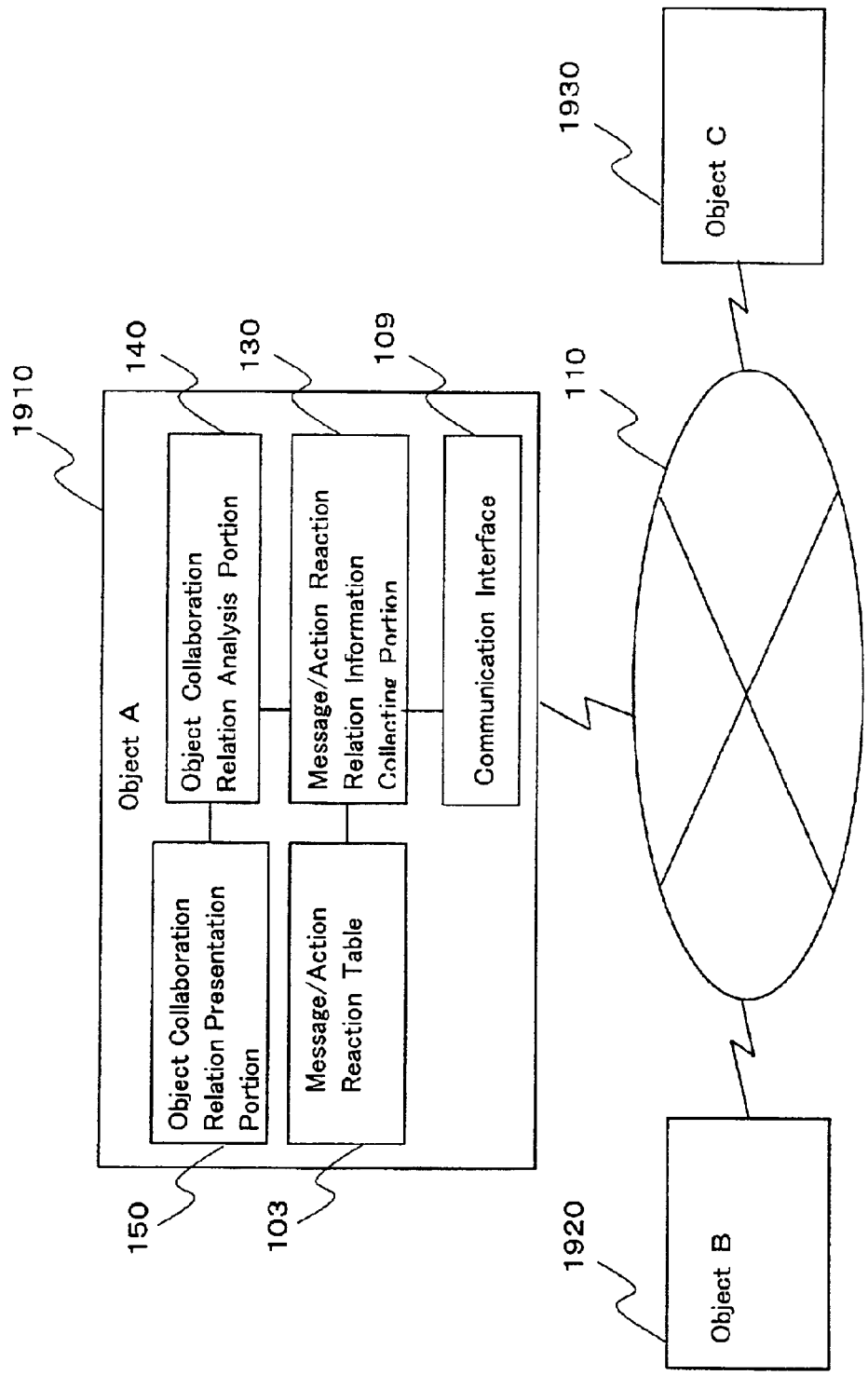
FIG. 19 is a diagram illustrating the basic principle of an object collaboration apparatus of a seventh embodiment of the present invention.

FIG. 19 is a diagram illustrating the basic principle of an object collaboration apparatus of the seventh embodiment. For the sake of explanation, only three object collaboration apparatuses A 1910, B 1920, and C 1930 are connected to the field 110 in the example of FIG. 19. In principle, there is no limitation to the number of connected object collaboration apparatuses, and the field 110 can also be comprised of many fields connected over a network such as the internet. Also, for the sake of explanation, structural elements have been omitted as appropriate in the object collaboration apparatuses in the example of FIG. 19, and for the object collaboration apparatus A 1910, only the communication interface 109, a message/action reaction table 103, the message/action reaction relation information collecting portion 130, the object collaboration relation analysis portion 140, and the object collaboration relation presentation portion 150 are shown, but in addition to that, the object collaboration apparatus A 1910 also includes the same structural elements shown in the FIGS. 4 and 17. Furthermore, in the drawings of the object collaboration apparatus B 1920 and the object collaboration apparatus C 1930, the internal structural elements have been completely omitted.

The following is an explanation of the extraction of object collaboration relations in a distributed object collaboration apparatus and a visualization method therefor. First, the object collaboration apparatuses extract information indicating the relation between messages and their associated actions from objects included in themselves and from the message/action reaction table 130 of the objects, with the message/action reaction relation information collecting portion 130. Then, this message/action reaction relation information is exchanged with the other object collaboration apparatuses. The message/action reaction relation information is floated as messages via the message sending portion 108 and the communication interface 109 on the field 110, and given to the other object collaboration apparatuses. Conversely, messages of message/action reaction information sent from the other object collaboration apparatuses are received via the communication interface 109 and the message receiving portion 101.

Figure 20:
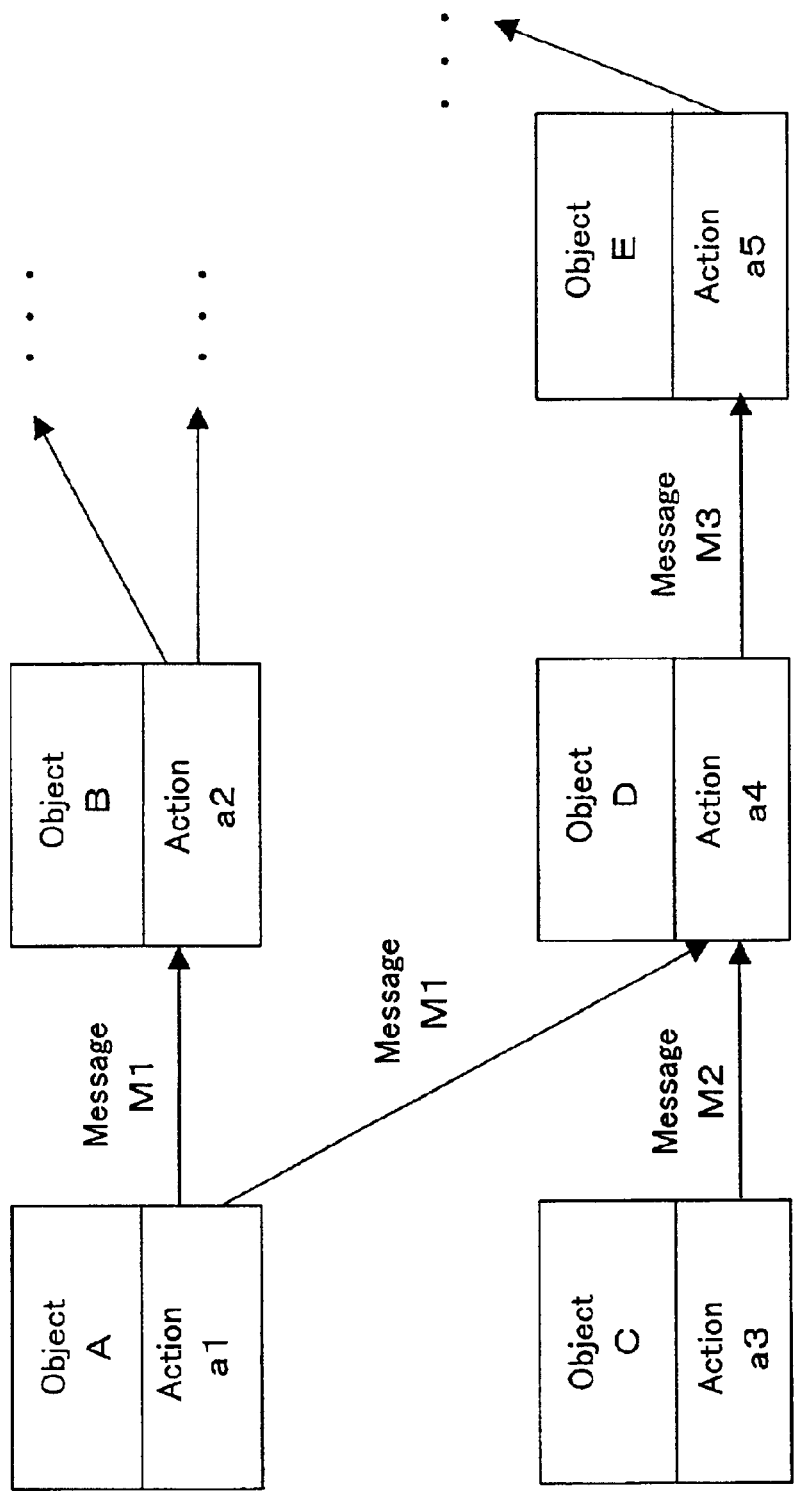
FIG. 20 shows an example of a visual chart generated by the object collaboration apparatus of the seventh embodiment of the present invention.

Next, the objects of the object collaboration apparatuses and the objects' message/action reaction information that have been obtained are analyzed by the object collaboration relation analysis portion 140, and the collaboration relation of the objects present on the field is analyzed and extracted. First of all, the objects are displayed as icons. For each object, messages to which the object can react, the actions reacting to these messages, and the messages sent out when these actions are started are extracted. Moreover, objects that have actions reacting to these sent messages are identified. This means that these message/action reaction relations signify the collaboration among objects. These collaborations are drawn as link lines between the object icons. This process is performed for all objects and their message/action reaction relations, and the object collaboration relations are explicitly displayed as a visual chart on the object collaboration relation display portion 150. An example of such a visual chart is shown in FIG. 20.

The square icons denote objects, whose lower half indicates an action. The arrows denote link lines indicating that objects at the arrow tips can react to messages sent out from objects at the arrow origins. The arrows are associated with messages floated on the field.

With the object collaboration apparatus of the seventh embodiment, the following advantageous effects can be attained.

Firstly, complicated object collaboration relations can be visualized in a visual chart, and collaboration relations can be grasped intuitively.

Secondly, it is possible to determine an action reactions that may be caused by an action before the fact. The reaction relations between messages and actions among objects collaborate more flexibly, and previously, there were cases in which it was difficult to anticipate what action reaction occurs at other objects an response to a message from a certain object, but with the object collaboration apparatus of the seventh embodiment, it is possible to present the message/action reaction relations and object collaboration relations as a visual chart.

Eighth Embodiment

In an object collaboration apparatus according to the eighth embodiment of the present invention, the object collaborations include an object collaboration core portion, in which object collaboration relations are maintained as a core, and an object collaboration interface portion for interfacing collaboration between the object collaboration core portion and other objects. In this example, when an object collaboration relation is changed, the relations of the object collaboration core portion stay unchanged, and the object collaboration relations are changed by changing the collaboration destination of the object collaboration interface portion.

If the object collaboration interface portion is located behind the object collaboration core portion in the flow of object collaboration, then the object collaboration interface portion becomes an action portion (output scope interface) reacting to the output message pattern of the object collaboration core portion, and the object collaboration destination can be changed in a flexible manner by rewriting the action. If it is located before the object collaboration core portion, then it becomes an input message pattern (input scope interface) to which the object collaboration core portion reacts, and if other objects send out messages that match this input message pattern, then they can have object collaboration with the object collaboration core portion.

FIG. 21 illustrates an example of a configuration, in which an object collaboration includes an object collaboration core portion and an object collaboration interface portion.

In FIG. 21A, two objects 2100a and 2100b enclosed by the solid line 2100 form an object collaboration core portion 2100, and the two objects 2110a and 2110b enclosed by the solid line 2110 form another object collaboration core portion 2110. In these portions, object collaborations maintain object collaboration relations as a core.

In the object collaboration core portion 2100, the object 2100a reacts to the message M26 in accordance with the information in the message/action reaction table 103, starts an action a26, and sends out a message M27. The object 2100b reacts to the message M27 according to the information in its message/action reaction table 103, starts the action a27, and sends out a message M28.

In the object collaboration core portion 2110, the object 2110a reacts to the message M29 in accordance with the information in its message/action reaction table 103, starts an action a29, and sends out a message M30. The object 2110b reacts to the message M30 according to the information in its message/action reaction table 103, starts the action a30, and sends out a message M31.

As shown in FIG. 21A, an object collaboration interface portion 2101 enclosed by a dotted line is provided between the object collaboration core portions 2100 and 2110. This object collaboration interface portion interfaces collaboration between an object collaboration core portion and other objects, and if the object collaboration relation is changed, it maintains the relation with the object collaboration core portion, and the object collaboration relations are changed by changing the collaboration destination of the object collaboration interface portion. The object collaboration interface portion also can be located before or behind the object collaboration core portions 2100 and 2110 in the flow of object collaboration, but for the sake of explanation, the object collaboration interface portion 2101 in this example is an interface between the two.

The object collaboration interface portion 2101 is an object that is controlled by one message/action reaction table 103, in which an action a28 associated with a message M28 is listed. This action a28 is the information that is sent out by the message M29 as a part of the action. By starting the action a28 in reaction to the message M28, it functions as an output scope interface 2102 of the object collaboration core portion 2100, and since the object collaboration core portion 2110 reacts to the sent message M29, it also functions as an input scope interface 2103 of the object collaboration core portion 2110. The output scope interface 2102 of the object collaboration core portion 2100 and the input scope interface 2103 of the object collaboration core portion 2110 are associated in that the listed action a28 sends a message M29 as a part of the action.

Figure 22:
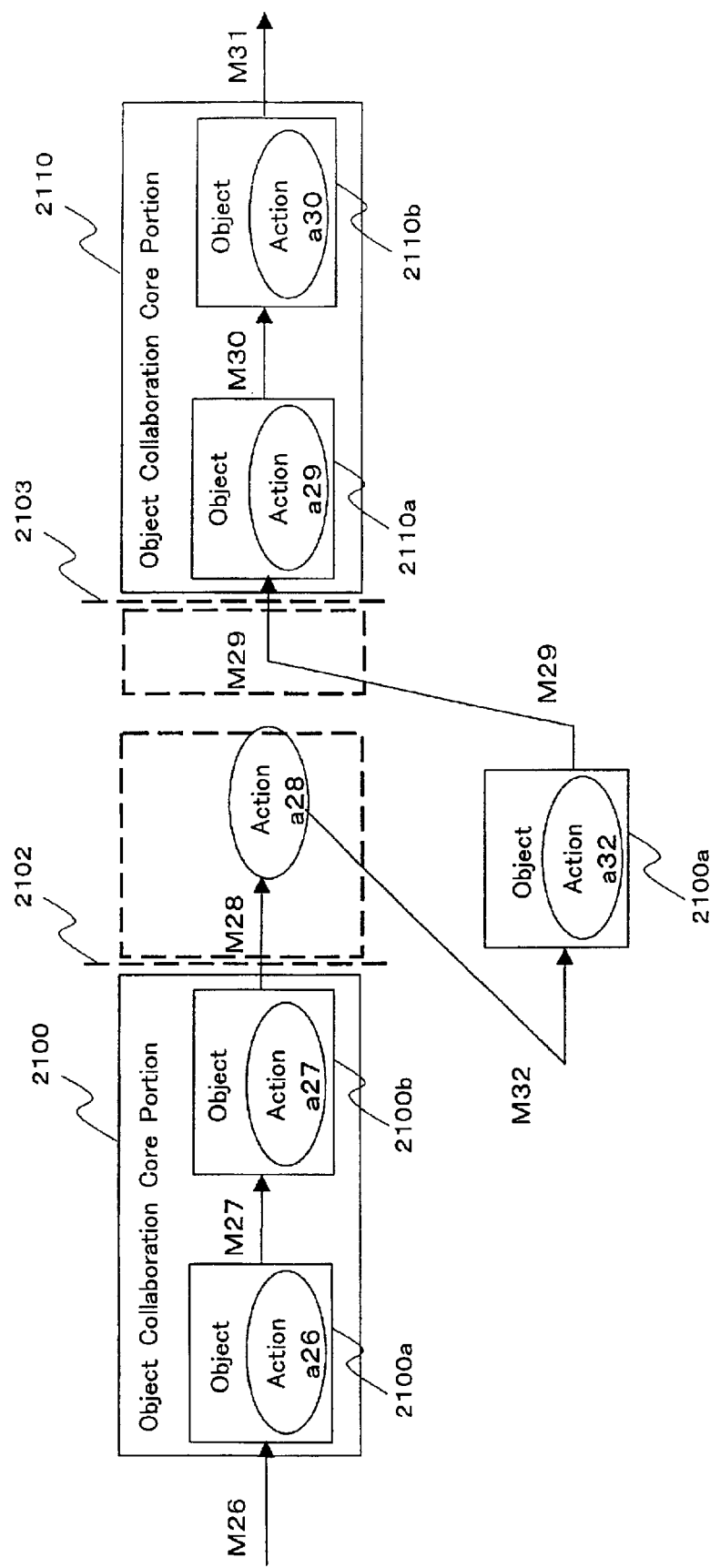
FIG. 22 illustrates a situation, in which the interface function of the object collaboration interface portions is exploited to change the object collaboration relations.

In the object that is the object collaboration interface portion 2101, the action a28 listed in the message/action reaction table 103 cuts the relation of sending out a message M29 as part of the action. That is to say, the information on the actions in the message/action reaction table 103 is rewritten. By rewriting the information on the actions in the message/action reaction table 103 of the object that is the object collaboration interface portion 2101, the relation between the output scope interface 2102 of the object collaboration interface core portion 2100 and the input scope interface 2103 of the object collaboration interface core portion 2110 is cut, but the two do not lose their function as interfaces for the object collaboration core portions. That is to say, the output scope interface 2102 and the input scope interface 2103 function as interfaces, and can organize new collaborations with other objects in a flexible manner. This situation is shown in FIG. 21B. The information of the actions in the message/action reaction table 103 is rewritten, and if the action a28 is listed as sending out M32 as part of the action, the effect that the output destination of the output scope interface 2102 is switched to an object 2120 can be attained. If the message M29 is sent out such that also the object 2120 in its output stage (it can also have an output scope interface) matches the input scope interface 2103, then it can collaborate with the object collaboration core portion 2110. Thus, by exploiting the interface function of the object collaboration interface portions, the object collaboration relations can be changed in a flexible manner. This situation is shown in FIG. 22.

Figure 23:
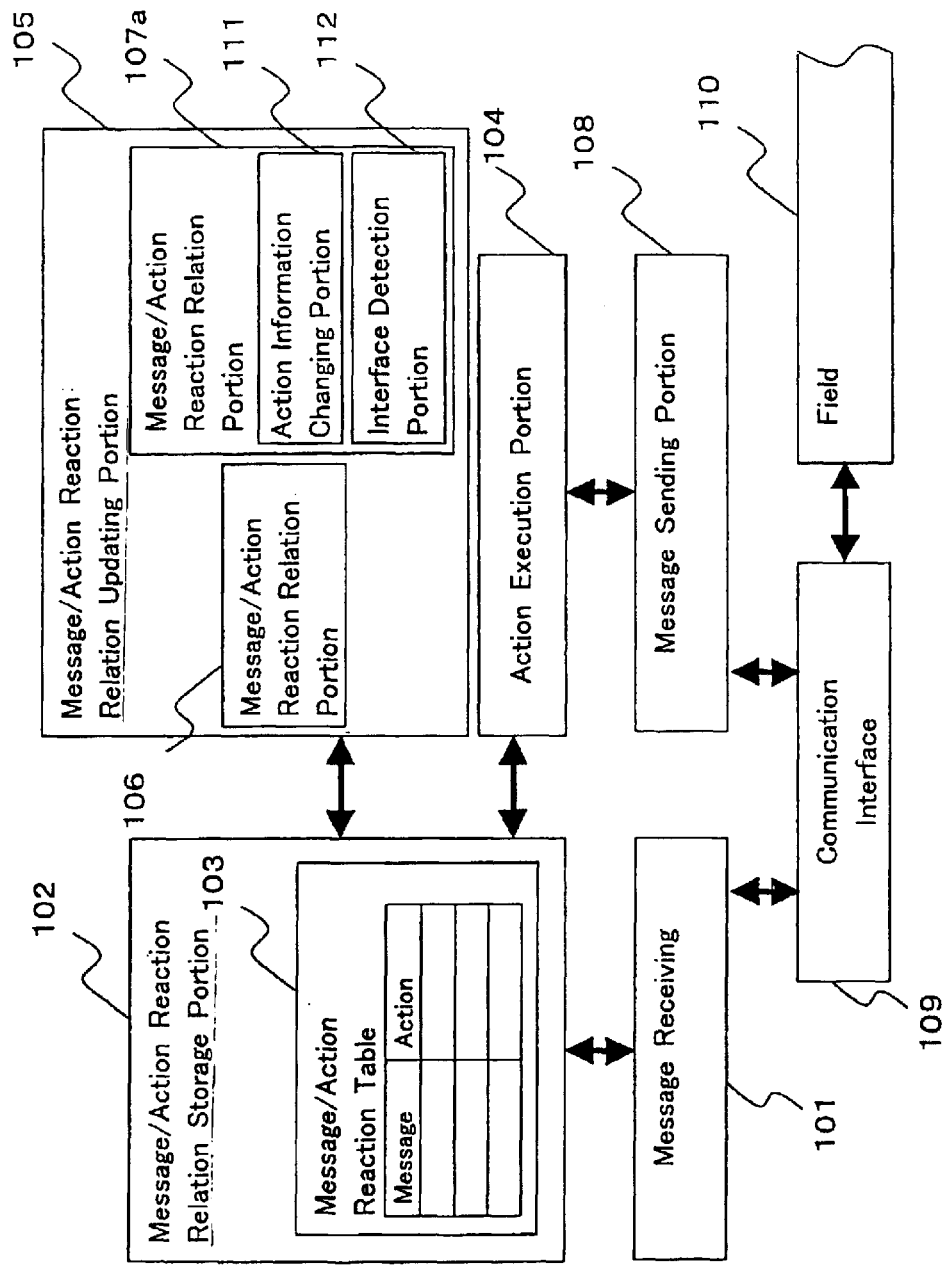
FIG. 23 is a block diagram showing the general outline of an object collaboration apparatus according to an eighth embodiment of the present invention.

FIG. 23 is a block diagram showing the general outline of an object collaboration apparatus according to the eighth embodiment. As shown in FIG. 23, in the object collaboration apparatus according to the eighth embodiment, a message/action reaction relation organizing portion 107*a* includes an action information changing portion 111 and an interface detection portion 112. The action information changing portion 111 rewrites the action information when the information in the message/action reaction table 103 is changed by the message/action reaction organizing portion 107*a*. The interface detection portion 112 detects input scope interfaces and output scope interfaces of object collaboration interface portions present on the field 110, and manages this interface information. The message/action reaction relation organizing portion 107*a* rewrites the action information of the managed objects, so as to connect to the input scope interface or output scope interface of the object with which a new object collaboration relation is to be organized, changing the action information such that a matching message is sent out, and organizes a new object collaboration relation. It should be noted that other structural elements that are the same as in the first to fourth embodiment have been marked by the same numerals, and their further explanation has been omitted.

In this manner, in the object collaboration apparatus according to the eighth embodiment of the present invention, the object collaborations include an object collaboration portion, in which object collaboration relations are maintained as a core, and an object collaboration interface portion for interfacing the collaboration between the object collaboration core portion and other objects. When an object collaboration relations are changed, the relations of the object collaboration core portion stay unchanged, and the object collaboration relations can be changed by changing the collaboration destination of the object collaboration interface portion.

Ninth Embodiment

The ninth embodiment relates to an object collaboration apparatus having the function of forming object collaboration by searching objects forming a collaboration relation connecting an object as the starting point and an object as the ending point.

This formation of object collaboration is determined by the object serving as the starting point and an object serving as the ending point for which object collaboration is to be organized, and a collaboration relation is formed by searching a collaboration of objects connecting the two. The object collaboration apparatus of the ninth embodiment performs the searching of object collaboration with an object searching portion 113.

The following is an explanation of the basic principle of object collaboration with the searching function of the ninth embodiment. Several patterns can be given as examples of the search function. For example, forward searching, backward searching and forward-and-backward bidirectional searching are possible. In the following explanation of an object collaboration apparatus of the ninth embodiment and the basic principle of its object searching function, backward searching is taken as an example.

Figure 24:
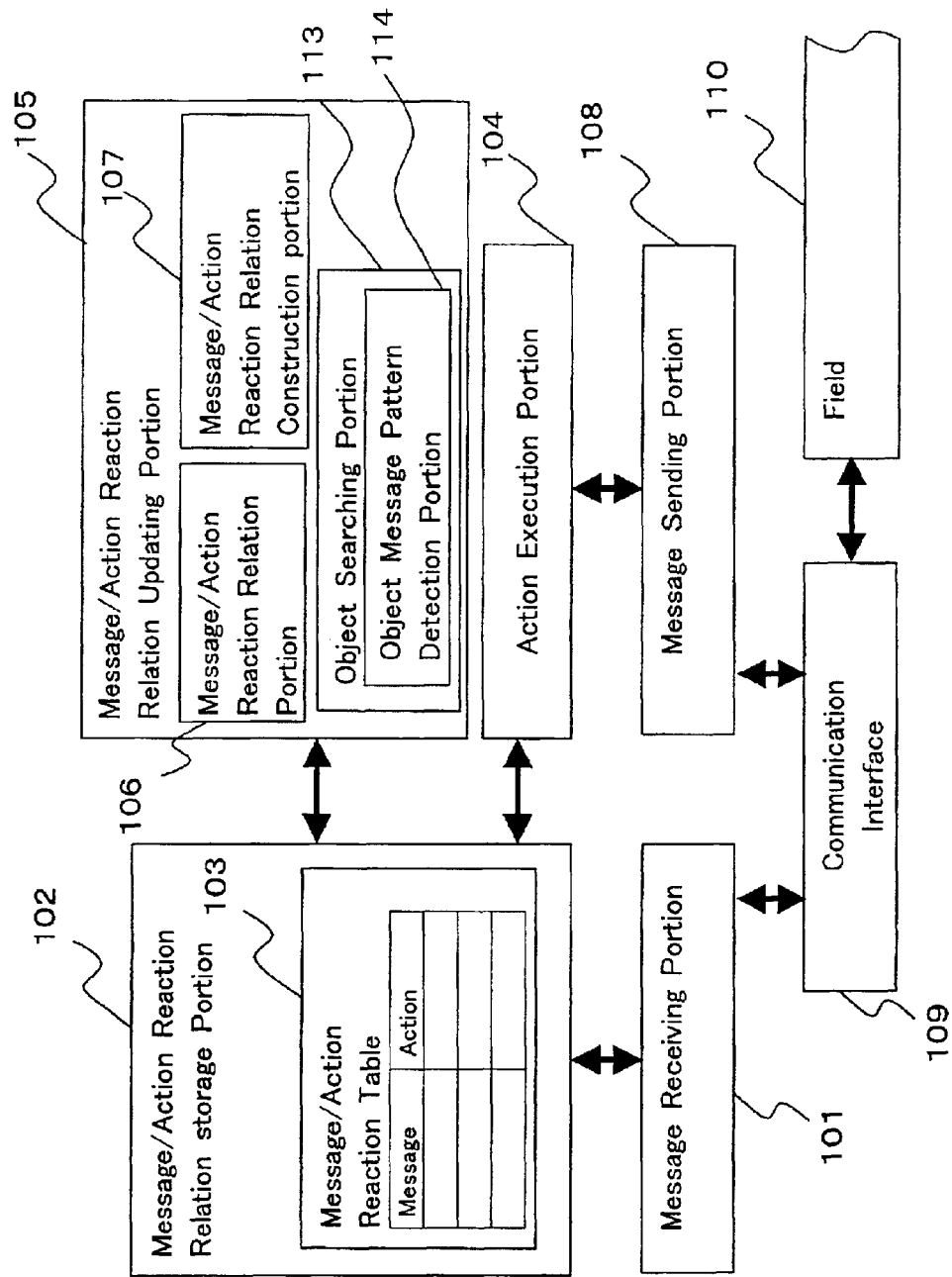
FIG. 24 is a block diagram showing the general outline of an object collaboration apparatus according to a ninth embodiment of the present invention.

FIG. 24 is a block diagram of the general configuration of an object collaboration apparatus in accordance with the ninth embodiment of the present invention. As shown in FIG. 24, the object collaboration apparatus of the ninth embodiment includes an object searching portion 113. Taking an input message pattern and an output message pattern as the search key, the object searching portion 113 searches for objects present on the field 110 that have this input message pattern or output message pattern. The object searching portion 113 can perform searches with the asterisk "*" as a wildcard in the search key. For example, if in the search key, "*" is taken for the input message pattern and "jpeg format" is taken for the output message pattern, then all objects whose output patterns is "jpeg format" are obtained as the result, regardless of their input message pattern. The object searching portion 113 includes an object message pattern detection portion 114, and can detect the input message pattern and the output message pattern of a specified object with the object message pattern detection portion 114. It is preferable that the detected input message pattern and output message pattern can be visually displayed, as shown for example in FIG. 25. It should be noted that other structural elements that are the same as in the first to fourth embodiment have been marked by the same numerals, and their further explanation has been omitted.

FIG. 25 illustrates the basic principle for searching an object collaboration from an object serving as the starting point to an object serving as the end point by backward searching. In this example, the user requests conversion of data in the format ⌈i⌋ (for example, data in bitmap format) into data in the format ⌈k⌋ (for example, compressed data in JPEG format), and this conversion is performed by collaboration of objects. Also, in this example, in the search process of the object searching portion 113, the input message pattern information and the output message pattern information of the objects are expressed as tags in the messages between objects on the field, and the object collaboration relations are expressed as tags in a programming language that includes tags, such as XML. FIG. 26 shows a DTD representing an input message or output message used in this embodiment.

In a first step, using the object message pattern detection portion 114, the object searching portion 113 detects the output message pattern of the object serving as the starting point and the input message pattern of the object serving as the ending point with a message in XML format indicating a presentation of starting point and ending point.

In the example in FIG. 25A, the left side represents the output message pattern (2401) of the object serving as the starting point. Here, it is the format ⌈i⌋. The right side represents the output message pattern (2402) of the object serving as the ending point. Here, it is the format ⌈k⌋. That is to say, if an object collaboration can be organized that starts from the output message pattern 2401 of the object serving as the starting point and ends at the input message pattern 2402 of the object serving as the ending point, then data of the format ⌈i⌋ can be converted into data of the format ⌈k⌋.

FIG. 27 shows an example of a message that the object searching portion 113 sends out in the first step. In the message in FIG. 27, the "MATRIX NAME" "FmtTranslate" represents the name and the type of the organized collaboration, and is a generic term for aspects defining the collaboration between modules, such as protocol, ontology, and content mark-up language. The entry item "Action" "request" means that this message requests the conversion of the file format of the starting point into the file format of the ending point, while presenting starting point and ending point of the collaboration. The entry item "Sender" "uiserv" indicates the sender of this message. The entry item "requestID" "dumy1" indicates the conversation ID of the collaboration among the modules. The entry item "OriginalMessageType" "⌈i⌋" indicates that the file format at the starting point is that of a file having the extension ⌈i⌋, and shows that the output pattern serving as the starting point is ⌈i⌋. The entry item "TargetMessageType" "⌈k⌋" indicates that the file format at the ending point is that of a file having the extension ⌈k⌋, and shows that the output pattern serving as the ending point is ⌈k⌋. The entry item "MessageKey" is the place of the ⌈i⌋ file in question, and indicates in this example, that the data can be retrieved by passing the key 936244885600 to the module ui.phx indicated by its URI. In this embodiment, the object accepting the message shown in FIG. 27 (imagearbiter.phx, explained below) has an input pattern that allows a reaction to the portion "Action", "Request", and includes an operation in response to the information indicated by the tags "OriginalMessageType" and "TargetMessageType".

In a second step in this example, since searching is carried out by backward searching, the object searching portion 113 sets the search key, taking a wildcard as the input message pattern and taking the input message pattern 2402 of the object serving as the ending point, that is, ⌈k⌋ as the output message pattern, and carries out a search. Here, "wildcard" refers to an arbitrary message pattern. FIG. 25B schematically illustrates this situation.

FIG. 28 shows an example of a message sent out by the object searching portion 113 in the second step. In FIG. 28, the entry item "Action" "in-request" indicates that this message requests a reply from the modules comprised in the pattern. "imagearbiter.phx" indicated in URI format in the entry item "Sender" indicates the sender of this message. "imagearbiter.phx" corresponds to a broker controlling a contract net for organizing a chain for performing file conversion of "FmtTranslate". The entry item "RequestID" "dumy1" is the conversation ID of the collaboration among modules and indicates that this is a message of a series continuing the message of FIG. 27. The entry item "OriginalMessageType" is denoted by an asterisk "*". The asterisk "*" is used as a wildcard, and means "any file format". That is to say, the extension of the file format serving as the starting point can be anything. The entry item "TargetMessageType" "⌈k⌋" means that the file format serving as the ending point is that of a file having the extension ⌈k⌋, and that the output pattern serving as the ending point is ⌈k⌋. The entry item "MessageKey" indicates the location of the ⌈i⌋ file in question, and is simply the location of the file as shown in FIG. 27. In the present embodiment, an object accepting the message shown in FIG. 28 (⌈j⌋ 2 ⌈k⌋.phx described below) has an input pattern that can react to the portion "Action", "in-request". The fact that "OriginalMessageType" in FIG. 28 is a wildcard shows that regardless of what is specified for the input pattern of the object on the accepting side (for example, ⌈j⌋ in the case of ⌈j⌋ 2 ⌈k⌋.phx in this embodiment), ⌈j⌋ can be accepted because it is comprised in the wildcard "*".

As the third step, the object searching portion 113 receives a reply returned as a reaction to the message sent out in the second step. When this reply is obtained, an object collaboration is accomplished, that connects to the input message pattern 2402 of the object serving as the ending point. This situation is shown conceptually in FIG. 25C. Thus, the searched collaboration from the object 2403 to the input message pattern 2402 of the object serving as the ending point is accomplished.

FIG. 29 shows an example of a message that the object searching portion 113 receives in the third step. In FIG. 29, the entry item "Action", "bid" shows that this message is a reply to "in-request" and has an input pattern comprised in the pattern of "in-request". "⌈j⌋ 2 ⌈k⌋.phx" shown in URI format in the entry item "Sender" indicates the sender of this message. "⌈j⌋ 2 ⌈k⌋.phx" presents a service constituting a contract net for organizing a chain for file conversion of "FmtTranslate". As shown below, it is a module that can convert file formats from the format ⌈j⌋ to the format ⌈k⌋. The entry item "RequestID" "dumy1" is the conversation ID of the collaboration among modules and indicates that this is a message of a series continuing the messages of FIGS. 27 and 28. The entry item "OriginalMessageType" is ⌈j⌋, which indicates that the module ⌈j⌋ 2 ⌈k⌋.phx converts ⌈j⌋ files into another format, and has the format ⌈j⌋ as the input pattern. This format ⌈j⌋ is comprised in the asterisk "*" of FIG. 28. The entry item "TargetMessageType" "⌈k⌋" indicates that the file format serving as the ending point is that of a file having the extension ⌈k⌋, and that the output pattern serving as the ending point is ⌈k⌋. The entry item "MessageKey" is as in FIG. 28, and indicates to where the ⌈k⌋ file to be output is being output to, so that the output file can be acquired using that key. The entry item "PathHistory" indicates that one stage of the chain has been organized.

Then, if the object collaboration has not yet reached the output message pattern of the object 2401 at the starting point, the second step and third step of searching collaborating objects are repeated. Here, the inquiry process of the second step is carried out once again. The input message pattern of the object 2403 is the format ⌈j⌋, so that the search key is set taking a wildcard as the input message pattern, and the format ⌈j⌋ as the output message pattern, and a search is carried out. FIG. 25D schematically illustrates this situation.

FIG. 30 shows an example of a message sent out by the object searching portion 113 in the repeated second step. In FIG. 30, the "Action" of the message is also "in-request", as in FIG. 27, and the sender of the message is "imagearbiter.phx". "MessageKey" and "PathHistory" are as shown in FIG. 29, and "RequestID" is as in FIG. 27 onward.

Then, if the object searching portion 113 receives the reply returned as a reaction to the message sent off in the repeated second step. Obtaining this reply, an object collaboration is obtained, which connects the object 2402 serving as the ending point in two steps with the object 2401 at the starting point. This situation is shown schematically in FIG. 25E. Here, it is assumed that an object 2404, whose input message pattern is the format ⌈i⌋, among the obtained replies. This object 2404 is selected. Thus, by backward searching, an object collaboration can be found, which performs object collaboration between the input message pattern 2402 of the object serving as the ending point and the object 2403, and further the object 2404, to the output message pattern 2401 of the object serving as the starting point. That is to say, an object collaboration is organized, in which a file with the output message pattern format ⌈i⌋ of the object 2401 serving as the starting point is converted through collaboration of the objects 2404 and 2403 into the input message format ⌈k⌋ of the object 2402 serving as the ending point.

FIG. 31 shows an example of the message that the object searching portion 113 receives in the repeated third step. In FIG. 31, the "Action" of the message is also "bid", as in FIG. 29, and the sender of the message is "win2s.phx", which can present the conversion service. The "PathHistory" is shown in addition to the one of FIG. 29. The "OriginMessageType" is the asterisk "*", which indicates that "win2 [j].phx" has the capability of converting any file format into the format [j]. With "bid" shown in FIGS. 29 and 31, a reply is obtained that any file format can be converted into the format ⌈k⌋, and the reply is obtained that a conversion from bmp-format to a ⌈k⌋ file, which was the request of FIG. 27, is possible. In the ninth embodiment, "imagearbiter.phx", which performs the control of the messages continuing from FIG. 28, checks the messages from FIG. 27 onward by monitoring them.

Then, in a fifth step, the file is actually converted using the obtained object collaboration. FIG. 32 shows an example of a message for requesting file conversion using the results obtained up to FIG. 31. In FIG. 32, the "Action" of the message is "in-serve", which requests the execution of a file conversion service. The sender of the message is "imagearbiter.phx", and the bidder of the contract net specifies "win2 [j].phx" with the item "Contract".

Then, in a sixth step, the result of the requested object collaboration is received. FIG. 33 shows an example of a message that returns the result of FIG. 32. Here, as in FIG. 34, receiving the result of FIG. 33, again the "imagearbiterphx", which serves as the broker object, again requests file conversion.

The "Action" of FIG. 32 is "in-serve" again, and this time "OriginalMessageType" and "TargetMessageType" are rewritten as ⌈j⌋0 and ⌈k⌋. By following the "PathHistory" of FIG. 33 backwards, the executer of the service, "[j] 2 ⌈k⌋" is selected, and the fact that it has been selected is indicated in the item "Contract".

The "Action" of FIG. 33 is "in-inform", and this means notifying that the file conversion has been terminated successfully. In FIG. 33, the "PathHistory" is one step shorter than in FIG. 32, because the processing is performed by "win2 ⌈j⌋". To acquire the converted file, the portion "MessageKey" is rewritten.

The "Action" of FIG. 34 is "in-serve" again, and this time "OriginalMessageType" and "TargetMessageType" are rewritten as ⌈j⌋ and ⌈k⌋. By following the "PathHistory" of FIG. 32 backwards, the executer of the service, " [j] 2 ⌈k⌋" is selected, and the fact that it has been selected is indicated in the item "Contract".

Then, like FIG. 34, FIG. 35 indicates that the file conversion has been terminated successfully. The aspect where FIG. 35 differs from FIG. 34 is that there is no item left in the "PathHistory". This also indicates that the series of processes initiated by FIG. 27 has been terminated. The fact that "TargetMessageType" is ⌈k⌋ indicates that the final file format is ⌈k⌋, and means that processing can be connected to a module having ⌈k⌋ as the input pattern and waiting for a pattern in which the "TargetMessageType" is ⌈k⌋. In this embodiment, "ui serv", which has sent the message of FIG. 27, displays the ⌈k⌋ file in reaction to a pattern in which input pattern is the ⌈k⌋ of the "TargetMessageType" ⌈k⌋.

With these process steps, the object collaboration apparatus of the ninth embodiment specifies an object serving as the starting point and an object serving as the ending point of an object collaboration to be organized, and a collaboration relation can be formed by searching for an object collaboration that connects the two.

As can be seen from these processes, with the object collaboration apparatus of the present embodiment, the search of the object collaboration relations is performed while gradually relaxing the collaboration scope (gradually widening the scope), taking a specified input message pattern as the search key, and taking a wild cart as the output message pattern. Compared to the method of tightening the scope from starting point to ending point method for searching object collaboration can be realized, that is more flexible than the method, in which, while widening the scope beginning at the starting point, an object collaboration from the starting point to the ending point is discovered when an image including the ending point is obtained.

Tenth Embodiment

Figure 36:
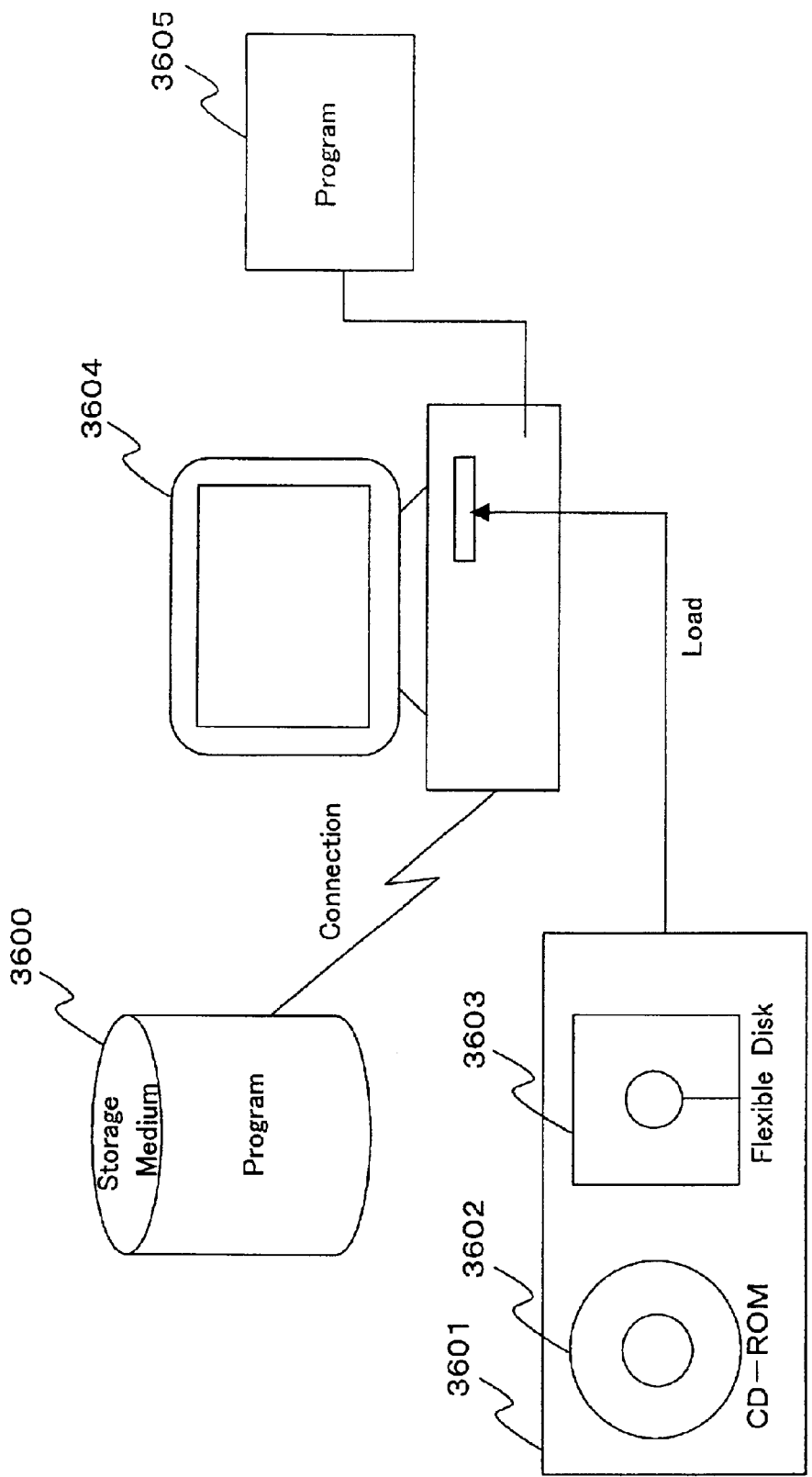
FIG. 36 is a diagram showing example of a storage medium storing a program for realizing an object collaboration apparatus of the present invention in accordance with the tenth embodiment.
Figure 37:
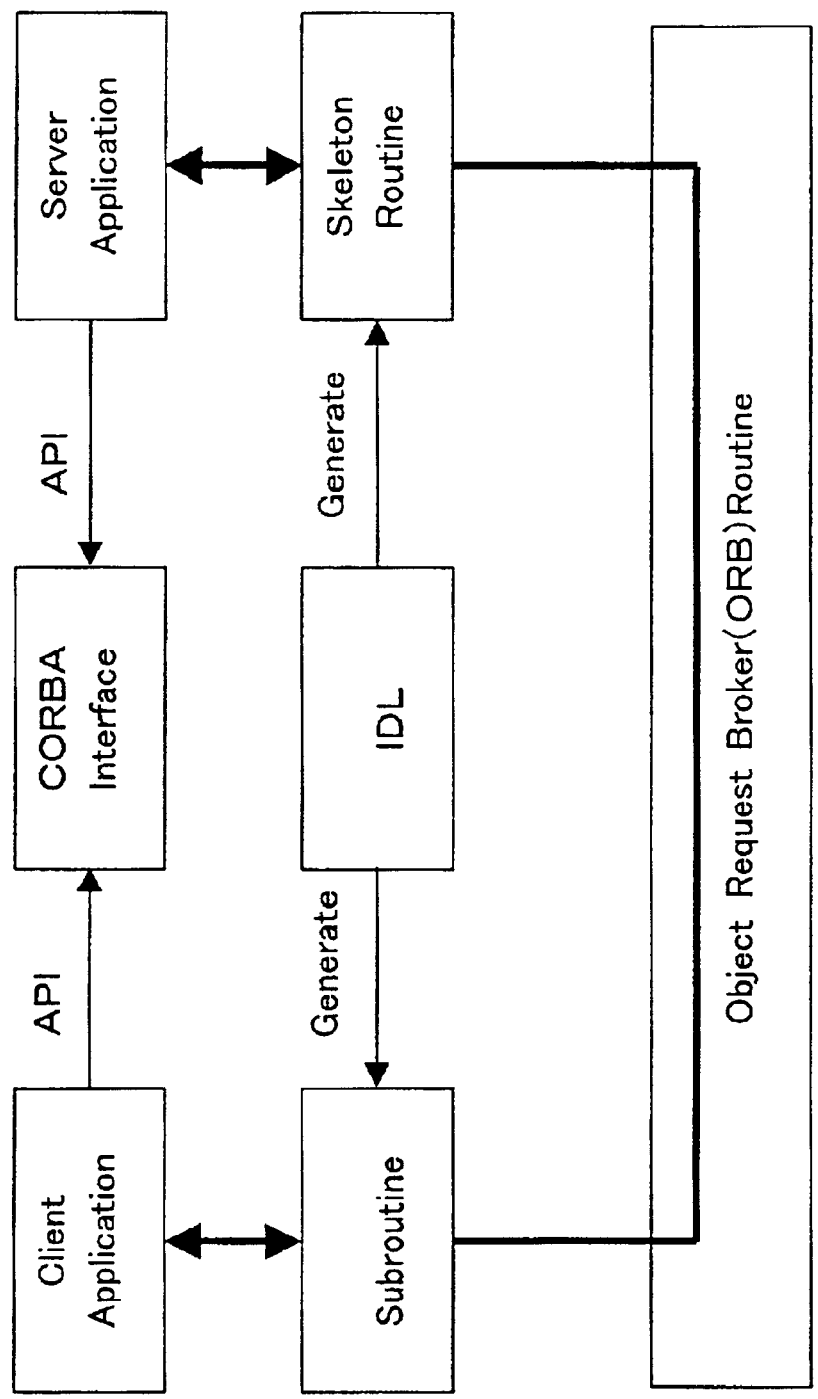
FIG. 37 shows an example of a conventional object collaboration in a client/server system based on CORBA.

The object collaboration apparatus of the present invention can be devised with various kinds of computers by providing a program that is stored on a computer-readable storage medium and contains the processing steps for realizing the above-described configurations. As shown in FIG. 36, the recording medium, on which the program providing the processing steps realizing the object collaboration apparatus according to the present invention is stored, can be not only a portable recording medium 3601 such as a CD-ROM 3602 or a flexible disk 3603, but also a recording medium 3600 in a recording apparatus on the network or a recording medium 3605 such as a hard disk of a computer or a RAM. When executing the program, the program is loaded into a computer 3604 and executed in its main memory.

Furthermore, the source program does not have to be in compiled form, but it is also possible to send an applet in an intermediate language to a client computer over a network, and to execute it with an interpreter on the client computer.

INDUSTRIAL APPLICABILITY

With the object collaboration apparatus of the present invention, the degree of freedom of collaboration among object collaboration apparatuses connected to a network can be increased, and a system can be organized, that can carry out collaboration processes such as dialogue or cooperation among computer groups or object groups, can adapt in a flexible manner to changes in an object-oriented environment, and that can change progressively. Furthermore, it is possible to design a system with a simple object collaboration situation at first, and expand the design by adding objects at a later stage as necessary.

With the object collaboration apparatus of the present invention, object collaboration insertion is possible in a flexible and dynamical manner, and it is possible to reduce the influence on objects before and after the insertion, so that changing and recompiling the program becomes unnecessary.

With the object collaboration apparatus of the present invention, independent object collaborations that do not collaborate with one another can be coupled to form a series of object collaborations in a flexible and dynamical manner, and it is possible to reduce the influence on objects before and after the coupling, so that changing and recompiling the program becomes unnecessary.

With the object collaboration apparatus of the present invention, it is possible to perform external intervention with an external object into a series of object collaborations and change the flow of object collaboration in a flexible and dynamical manner, and to reduce the influence on objects before and after the change, so that changing and recompiling the program becomes unnecessary.

With the object collaboration apparatus of the present invention, it is possible that, taking an object collaboration having an action reacting to a certain message, objects are additionally organized in a flexible and dynamical manner that have an action reacting to this message in parallel, organizing a situation of receiver-side participation of object collaboration.

With the object collaboration apparatus of the present invention, it is possible that, taking an object collaboration having an action reacting to a certain message, objects are additionally organized in a flexible and dynamical manner that have an action of sending this message in parallel, organizing a situation of sender-side participation of object collaboration.

With the object collaboration apparatus of the present invention, it is possible that in addition to message/action reaction relations, message/action reaction conditions are set for these reactions, allowing a more flexible operation. By setting reaction conditions to avoid the concentration of loads, load distributed processing becomes possible, balancing the entire network.

With the object collaboration apparatus of the present invention, it is possible to display the collaboration relation among object collaboration apparatuses on the network as a visual chart, which can be grasped intuitively, making it possible to determine action reactions before they occur.

With the object collaboration apparatus of the present invention, it is possible to specify an object serving as the starting point of an object collaboration to be organized and an object serving as an end point thereof, and form an object collaboration by searching an object collaboration connecting the two.

What is claimed is:

1. An object collaboration apparatus, wherein objects comprise:
   a message receiving portion for monitoring and inputting messages that have been sent over a network;
   a message/action reaction relation storage portion for storing relations between messages and information on actions that are reactions to the messages;
   an action execution portion that executes actions in accordance with the message/action reaction relations;
   a message/action reaction relation update control portion for controlling an updating of reaction relations between messages and actions in accordance with the necessity to update the message/action reaction relations; and
   a message/action reaction relation organizing portion for associating specified actions to specified messages with the message/action reaction relation update controlling portion; wherein
   a new reaction relation between an action and a message is organized by intervening into an existing reaction relation between an action and a message;
   specification of the message/action reaction relation update controlling portion is specification of an existing message/action relation between a first message and a first action to be intervened and specification of a second action to be added, as well as specification of intervention information on additional organizing of a reaction relation of the second action with the first message; and
   a relation between the first message and the second action is additionally organized with the message/action reaction relation organizing portion, and object collaboration based on the relation between the first message and the first action is made parallel to a new object collaboration based on the relation between the first message and the second action.

2. An object collaboration apparatus, wherein objects comprise:
   a message receiving portion for monitoring and inputting messages that have been sent over a network;
   a message/action reaction relation storage portion for storing relations between messages and information on actions that are reactions to the messages;
   an action execution portion that executes actions in accordance with the message/action reaction relations;
   a message/action reaction relation update control portion for controlling an updating of reaction relations between messages and actions in accordance with the necessity to update the message/action reaction relations; and
   a message/action reaction relation organizing portion for associating specified actions to specified messages with the message/action reaction relation update controlling portion; wherein
   a new reaction relation between an action and a message is organized by intervening into an existing reaction relation between an action and a message;
   specification of the message/action reaction relation update controlling portion is specification of an existing message/action relation between a first message and a first action to be intervened, specification of an existing second action outputting a first message and a third action to be added, and specification of intervention information on additional organizing of a new collaboration relation of the specified third action with the first action;
   a relation in which the third action outputs the first message is additionally organized with the message/action reaction relation organizing portion, providing a new object collaboration; and
   object collaboration by the relation between the second action, the first message and the first action becomes parallel to the new object collaboration by the relation between the third action, the first message and the first action.

3. An object collaboration apparatus, wherein objects comprise:
   a message receiving portion for monitoring and inputting messages that have been sent over a network;
   a message/action reaction relation storage portion for storing relations between messages and information on actions that are reactions to the messages;
   an action execution portion that executes actions in accordance with the message/action reaction relations;
   a message/action reaction relation update control portion for controlling an updating of reaction relations between messages and actions in accordance with the necessity to update the message/action reaction relations; and
   a message/action reaction relation organizing portion for associating specified actions to specified messages with the message/action reaction relation update controlling portion; wherein
   a new reaction relation between an action and a message is organized by intervening into an existing reaction relation between an action and a message;
   if there is a plurality of independent object collaborations in which messages and actions collaborate, then specification of the message/action reaction relation update controlling portion is specification of an existing first object collaboration and an existing second object collaboration to be intervened, and specification of intervention information of coupling the specified independent object collaborations;
   a new message/action reaction relation is additionally organized with the message/action reaction relation organizing portion between a first message outputted when executing an action on an ending side of the specified first object collaboration and a new action outputting a second message to which an action of the beginning side of the specified second object collaboration reacts, coupling the independent object collaborations.

4. The object collaboration apparatus according to claim 3, wherein by eliminating the additionally organized message/action reaction relation with the message/action reaction relation organizing portion, the coupled object collaborations are separated into independent object collaborations.

5. An object collaboration apparatus, wherein objects comprise:
   a message receiving portion for monitoring and inputting messages that have been sent over a network;
   a message/action reaction relation storage portion for storing relations between messages and information on actions that are reactions to the messages;
   an action execution portion that executes actions in accordance with the message/action reaction relations;
   a message/action reaction relation update control portion for controlling an updating of reaction relations between messages and actions in accordance with the necessity to update the message/action reaction relations;
   a message/action reaction relation organizing portion for associating specified actions to specified messages with the message/action reaction relation update controlling portion; and
   a message/action reaction relation separation portion for separating an existing message/action reaction relation in the message/action reaction relation storage portion specified by the message/action reaction relation update controlling portion, wherein
   a new reaction relation between an action and a message is organized by intervening into an existing reaction relation between an action and a message.

6. The object collaboration apparatus according to claim 5, wherein specification of the message/action reaction relation update controlling portion is specification of an existing message/action reaction relation to be separated and specification of an object having a new message/action reaction relation to be inserted;
   based on the specification, the message/action reaction relation separation portion separates the existing relation of message and action;
   based on the specification, the message/action reaction relation organizing portion associates the existing message with the new action and associates the new message outputted as a part of the new action with the existing action; and
   the object having the new message/action reaction relation is inserted between the existing message and the exiting action.

7. The object collaboration apparatus according to claim 6, wherein new message/action reaction relations by objects inserted between the existing message and the existing action are cascaded, and object collaboration from the existing message through cascaded collaborations of actions and messages to the existing action is achieved.

8. The object collaboration apparatus according to claim 5, wherein when the relation between an existing message and an existing action is cascaded, and there is a relation from one message through several collaborations of actions and messages to one action,
   specification of the message/action reaction relation update controlling portion is specification of a relation between an existing first message and first action and a relation between an existing second message and second action to be intervened, and specification of information to associate the specified first message with the second action and remove any objects between the two; and
   with the message/action reaction relation organizing portion, the action content is changed from outputting the first message to outputting the second message, the object collaboration destination is changed such that the second action reacts to the second message, and existing objects pertaining to collaboration from the first action to the second message are removed.

9. The object collaboration apparatus according to claim 5, wherein when the relation between an existing message and an existing action is cascaded, and there is a relation from one message through several collaborations of actions and messages to one action, then specification of the message/action reaction relation update controlling portion is specification of a relation between an existing first message and first action and a relation between an existing second message and second action to be intervened, and specification of information to associate the specified first message with the second action and remove any objects between the two;
   the relation between the second message and the second action is separated by the message/action reaction relation separation portion; and
   with the message/action reaction relation organizing portion, the first message is associated with the second action to change the object collaboration destination such that the second action reacts to the second message, and existing objects pertaining to collaboration from the first action to the second message are removed.

10. The object collaboration apparatus according to claim 5, wherein object collaborations based on message/action reactions comprise:
    an object collaboration core portion, in which object collaboration relations are maintained as a core; and
    an object collaboration interface portion for interfacing collaboration between the object collaboration core portion and other objects; wherein
    when an object collaboration relation is changed, the relations of the object collaboration core portion are maintained unchanged, and the object collaboration relation is changed by changing the collaboration destination of the object collaboration interface portion.

11. The object collaboration apparatus according to claim 10, wherein the object collaborations comprise a first object collaboration core portion, a first object collaboration interface portion that is an object collaboration interface portion for the first object collaboration core portion, a second object collaboration core portion and a second object collaboration interface portion that is an object collaboration interface portion for the second object collaboration core portion; wherein
    when the first object collaboration interface portion and the second object collaboration interface portion are associated by one message/action reaction relation and object collaboration has been organized,
    specification of the message/action reaction relation update controlling portion is specification of a separation of the collaboration between the first object collaboration interface portion and the second object collaboration interface portion, and specification of a new object to be inserted;

the message/action reaction relation separation portion separates the collaboration between the first object collaboration interface portion and the second object collaboration interface portion based on the specification; and the message/action reaction relation organizing portion associates a relation of the first object collaboration interface portion with the object to be inserted and associates the object to be inserted with the second object collaboration interface portion based on the specification, inserting the new object.

12. An object collaboration apparatus, wherein objects comprise:

a message receiving portion for monitoring and inputting messages that have been sent over a network;

a message/action reaction relation storage portion for storing relations between messages and information on actions that are reactions to the messages;

an action execution portion that executes actions in accordance with the message/action reaction relations;

a message/action reaction relation update control portion for controlling an updating of reaction relations between messages and actions in accordance with the necessity to update the message/action reaction relations; and a message/action reaction relation organizing portion for associating specified actions to specified messages with the message/action reaction relation update controlling portion; wherein a new reaction relation between an action and a message is organized by intervening into an existing reaction relation between an action and a message;

object collaborations based on message/action reactions comprise:

an object collaboration core portion, in which object collaboration relations are maintained as a core; and an object collaboration interface portion for interfacing collaboration between the object collaboration core portion and other objects; and when an object collaboration relation is changed, the relations of the object collaboration core portion are maintained unchanged, and the object collaboration relation is changed by changing the collaboration destination of the object collaboration interface portion.

13. The object collaboration apparatus according to claim 12, further comprising a function for notifying input pattern and output pattern of the object collaboration interface portion to the outside.

14. The object collaboration apparatus according to claim 12, wherein an input pattern and an output pattern of the object collaboration interface portion can be changed.

15. An object collaboration apparatus, wherein objects comprise:

a message receiving portion for monitoring and inputting messages that have been sent over a network;

a message/action reaction relation storage portion for storing relations between messages and information on actions that are reactions to the messages;

an action execution portion that executes actions in accordance with the message/action reaction relations; and an object collaboration relation presentation portion for presenting objects and object collaboration relations that have been organized between objects;

wherein, taking an acceptance scope in which messages inputted by the message receiving portion are acceptable as input message pattern information and taking an output scope to which the action execution portion can output messages as output message pattern information, the object collaboration relation presentation portion presents the object collaboration relations to be presented as collaboration relations between the input message pattern information and the output message pattern information, and message/action reaction conditions for executing actions in response to received messages are set for each object, and the object collaboration relation presentation portion also includes the presentation of the message/action reaction conditions in the object collaboration relations to be displayed.

16. The object collaboration apparatus according to claim 15, wherein the object collaboration relation presentation portion displays the objects as icons, displays the object collaboration relations as link information between the icons, and visualizes objects and organized object collaboration relations graphically.

17. The object collaboration apparatus according to claim 15, wherein the object collaboration relation presentation portion presents the object collaboration relations as a table.

18. The object collaboration apparatus according to claim 15, wherein the object collaboration relation presentation portion expresses the input message pattern information and the output message pattern information as tags, and displays the object collaboration relations with a programming language including these tags.

19. The object collaboration apparatus according to claim 15, wherein the object collaboration relation presentation portion includes an object collaboration information inquiry function for inquiring object collaboration information of each of the objects; an object collaboration information collecting function for collecting object collaboration information of the objects, which is given by the objects in response to an inquiry to the objects; an object collaboration relation organizing function for organizing information of the object collaboration relations of all objects from the collected object collaboration information of the objects; and an object collaboration relation presentation function for presenting the organized object collaboration relations.

20. The object collaboration apparatus according to claim 19, wherein the objects further comprise an object collaboration information notification function for responding with the object's object collaboration information to an inquiry by the object collaboration information inquiry function.

21. The object collaboration apparatus according to claim 19, comprising an object collaboration control portion, the object collaboration control portion comprising an object collaboration change detection function for detecting when a change in the object collaboration relations organized by the object collaboration relation organizing function occurs; an object collaboration illogicality detection function for detecting when a collaboration illogicality occurs in the object collaborations; and an object collaboration logic protection function for canceling the object collaboration change when the object collaboration illogicality detection portion has detected an illogicality in the object collaborations.

22. An object collaboration apparatus, wherein objects comprise:

a message receiving portion for monitoring and inputting messages that have been sent over a network;

a message/action reaction relation storage portion for storing relations between messages and information on actions that are reactions to the messages;

an action execution portion that executes actions in accordance with the message/action reaction relations; and an object searching portion which, taking a message pattern exchanged between objects that are present on the network as a search key, searches for objects that have this message pattern as an input/output message pattern; wherein to form an object collaboration from a first object serving as a starting point to a second object serving as an ending point, the object searching portion detects an output message pattern of the first object and an input message pattern of the second object, searches objects collaborating with these message patterns, taking the detected message patterns of the objects as a search key, and forms an object collaboration from the first object serving as the starting point to the second object serving as the ending point, and the object searching portion includes an object message pattern detection portion, and specified input message patterns and output message patterns can be detected with the object message pattern detection portion.

23. An object collaboration apparatus, wherein objects comprise:

a message receiving portion for monitoring and inputting messages that have been sent over a network;

a message/action reaction relation storage portion for storing relations between messages and information on actions that are reactions to the messages;

an action execution portion that executes actions in accordance with the message/action reaction relations; and an object searching portion which, taking a message pattern exchanged between objects that are present on the network as a search key, searches for objects that have this message pattern as an input/output message pattern; wherein to form an object collaboration from a first object serving as a starting point to a second object serving as an ending point, the object searching portion detects an output message pattern of the first object and an input message pattern of the second object, searches objects collaborating with these message patterns, taking the detected message patterns of the objects as a search key, and forms an object collaboration from the first object serving as the starting point to the second object serving as the ending point;

the object searching portion an a first search, takes the output message pattern of the first object as the input message pattern and any pattern as the output message pattern, and searches a third object group;

in a second search, takes the output message patterns of the objects of the third object group as the input message pattern and any pattern as the output message pattern, and searches a fourth object group;

selects from the output message patterns of the objects of the fourth object group a fourth object whose output message pattern matches with the input message pattern of the second object, and selects from the objects of the third object group a third object having as the output message pattern the input message pattern of the selected fourth object; and forms an object collaboration from the first object via the third object and the fourth object to the second object.

24. The object collaboration apparatus according to claim 23, wherein if among the objects of the fourth object group there is no object whose output message pattern matches with the input message pattern of the second object, then, in a third search, taking the output message patterns of the objects of the fourth object group as the input message pattern and any pattern as the output message pattern, the procedure of searching a fifth object group is repeated, repeating the search of object groups until one of the output message patterns of the objects in those object groups matches the input message pattern of the second object, and an object collaboration from the first object to the second object is formed.

25. An object collaboration apparatus, wherein objects comprise:

a message receiving portion for monitoring and inputting messages that have been sent over a network;

a message/action reaction relation storage portion for storing relations between messages and information on actions that are reactions to the messages;

an action execution portion that executes actions in accordance with the message/action reaction relations; and an object searching portion which, taking a message pattern exchanged between objects that are present on the network as a search key, searches for objects that have this message pattern as an input/output message pattern; wherein to form an object collaboration from a first object serving as a starting point to a second object serving as an ending point, the object searching portion detects an output message pattern of the first object and an input message pattern of the second object, searches objects collaborating with these message patterns, taking the detected message patterns of the objects as a search key, and forms an object collaboration from the first object serving as the starting point to the second object serving as the ending point;

the object searching portion in a first search, takes any pattern as the input message pattern and the input message pattern of the second object as the output message pattern, and searches a third object group;

in a second search, takes any pattern as the input message pattern and the input message patterns of the objects of the third object group as the output message pattern, and searches a fourth object group;

selects from the input message patterns of the objects of the fourth object group a fourth object whose input message pattern matches with the output message pattern of the first object, and selects from the third object group a third object having as the input message pattern the output message pattern of the selected fourth object; and forms an object collaboration from the first object via the fourth object and the third object to the second object.

26. The object collaboration apparatus according to claim 25, wherein if among the objects of the fourth object group there is no object whose input message pattern matches with the output message pattern of the first object, then, in a third search, taking any pattern as the input message pattern and the input message patterns of the objects of the fourth object group as the output message pattern, the procedure of searching a fifth object group is repeated, repeating the search of object groups until one of the input message patterns of the objects in those object groups matches the output message pattern of the first object, and an object collaboration from the first object to the second object is formed.

27. An object collaboration apparatus, wherein objects comprise:

a message receiving portion for monitoring and inputting messages that have been sent over a network;

a message/action reaction relation storage portion for storing relations between messages and information on actions that are reactions to the messages;

an action execution portion that executes actions in accordance with the message/action reaction relations; and an object searching portion which, taking a message pattern exchanged between objects that are present on the network as a search key, searches for objects that have this message pattern as an input/output message pattern; wherein to form an object collaboration from a first object serving as a starting point to a second object serving as an ending point, the object searching portion detects an output message pattern of the first object and an input message pattern of the second object, searches objects collaborating with these message patterns, taking the detected message patterns of the objects as a search key, and forms an object collaboration from the first object serving as the starting point to the second object serving as the ending point;

the object searching portion in a first search, takes the output message pattern of the first object as the input message pattern and any pattern as the output message pattern, and searches a third object group;

in a second search, takes any pattern as the input message pattern and the input message pattern of the second object as the output message pattern, and searches a fourth object group;

selects a combination, in which the output message patterns of the objects of the third object group matches with the input message pattern of the fourth object group, and takes the object of the third object group in this combination as the third object the object of the fourth object group in this combination as the fourth object; and forms an object collaboration from the first object via the third object and the fourth object to the second object.

28. The object collaboration apparatus according to claim 27, wherein if among the objects of the third object group there is no object whose output message pattern matches with the input message pattern of an object of the fourth object group, then, in a third search, taking the output message patterns of the objects of the third object group as the input message pattern and any pattern as the output message pattern, the procedure of searching a fifth object group is repeated, in a fourth search, taking any pattern as the input message pattern and the input message patterns of the objects of the fourth object group as the output message pattern, the procedure of searching a sixth object group is repeated, repeating the search of object groups until one of the output message patterns of the objects in one of the object groups matches the input message pattern of the other object group, and an object collaboration from the first object to the second object is formed.

* * * * *